United States Patent
Yamamoto et al.

(10) Patent No.: US 9,020,673 B2
(45) Date of Patent: Apr. 28, 2015

(54) HYBRID VEHICLE AND CONTROL METHOD FOR THE SAME

(75) Inventors: Masaya Yamamoto, Kasugai (JP); Masashi Funada, Obu (JP)

(73) Assignees: Toyota Jidosha Kabushiki Kaisha, Aichi-ken (JP); Denso Corporation, Aichi-ken (JP)

(*) Notice: Subject to any disclaimer, the term of this patent is extended or adjusted under 35 U.S.C. 154(b) by 164 days.

(21) Appl. No.: 13/701,261

(22) PCT Filed: Jun. 3, 2011

(86) PCT No.: PCT/IB2011/001208
§ 371 (c)(1),
(2), (4) Date: Nov. 30, 2012

(87) PCT Pub. No.: WO2011/151712
PCT Pub. Date: Dec. 8, 2011

(65) Prior Publication Data
US 2013/0073136 A1 Mar. 21, 2013

(30) Foreign Application Priority Data
Jun. 4, 2010 (JP) .................................. 2010-128779

(51) Int. Cl.
*B60W 20/00* (2006.01)
*B60K 6/445* (2007.10)
(Continued)

(52) U.S. Cl.
CPC ................ *B60W 20/10* (2013.01); *B60K 6/445* (2013.01); *B60L 2240/486* (2013.01);
(Continued)

(58) Field of Classification Search
CPC ... B60W 20/10; B60W 20/102; B60W 20/20; B60W 10/06; B60W 10/08; B60W 10/26; B60W 30/182; B60W 30/188; B60W 50/082; B60K 6/445
USPC ............................. 701/22; 180/65.23, 65.265
See application file for complete search history.

(56) References Cited

U.S. PATENT DOCUMENTS 7,925,417 B2 * 4/2011 Muta et al. ..................... 701/103
2005/0003927 A1 * 1/2005 Asakawa et al. .................. 477/3
(Continued)

FOREIGN PATENT DOCUMENTS

DE 10 2008 002 505 A1 12/2009
EP 2 070 788 A1 6/2009
(Continued)

OTHER PUBLICATIONS

International Search Report and Written Opinion for corresponding International Patent Application No. PCT/IB2011/001208 mailed Aug. 19, 2011.

*Primary Examiner* — John Q Nguyen
*Assistant Examiner* — Nadeem Odeh
(74) *Attorney, Agent, or Firm* — Sughrue Mion, PLLC

(57) ABSTRACT

A hybrid vehicle includes an internal combustion engine (22), a motor (MG2), and a secondary battery (50), and travels in an electric-powered travel mode and in a hybrid travel mode. In the hybrid vehicle, an execution travel mode is set to one of two travel modes including an electric-powered travel priority mode where the hybrid vehicle travels with priority being given to the electric-powered travel mode over the hybrid travel mode, and a hybrid travel priority mode where the hybrid vehicle travels with priority being given to the hybrid travel mode over the electric-powered travel mode. When the execution travel mode is switched while the internal combustion engine (22) is being operated, the internal combustion engine (22) and the motor (MG2) are controlled so that charging/discharging electric power for charging or discharging the secondary battery (50) is gradually changed and the hybrid vehicle travels in the switched execution travel mode (S750 to S800).

12 Claims, 13 Drawing Sheets

(51) Int. Cl.
*B60W 10/06* (2006.01)
*B60W 10/08* (2006.01)
*B60W 10/26* (2006.01)
*B60W 30/182* (2012.01)
*B60W 30/188* (2012.01)
*B60W 50/08* (2012.01)
*B60W 50/00* (2006.01)

(52) U.S. Cl.
CPC .............. *B60W 10/06* (2013.01); *B60W 10/08* (2013.01); *B60W 10/26* (2013.01); *B60W 20/102* (2013.01); *B60W 30/182* (2013.01); *B60W 30/188* (2013.01); *B60W 50/082* (2013.01); *B60W 2050/0066* (2013.01); *B60W 2510/244* (2013.01); *B60W 2540/04* (2013.01); *B60W 2540/10* (2013.01); *B60W 2710/105* (2013.01); *B60W 2710/1061* (2013.01); *Y02T 10/6239* (2013.01); *Y02T 10/6269* (2013.01); *Y02T 10/6286* (2013.01); *B60W 20/20* (2013.01); *Y10S 903/93* (2013.01)

(56) References Cited

U.S. PATENT DOCUMENTS

| | | |
|---|---|---|
| 2007/0181354 A1 | 8/2007 | Andri |
| 2009/0248228 A1 | 10/2009 | Miller |
| 2009/0288896 A1* | 11/2009 | Ichikawa ................. 180/65.265 |
| 2009/0306843 A1 | 12/2009 | Jinno et al. |
| 2010/0038159 A1 | 2/2010 | Jinno et al. |
| 2010/0100265 A1 | 4/2010 | Kato |
| 2010/0145560 A1 | 6/2010 | Komatsu et al. |
| 2011/0010031 A1* | 1/2011 | Syed et al. ...................... 701/22 |

FOREIGN PATENT DOCUMENTS

| | | |
|---|---|---|
| JP | 10-098804 A | 4/1998 |
| JP | 2007-062640 A | 3/2007 |
| JP | 2009-018713 A | 1/2009 |
| JP | 2010-104095 A | 5/2010 |
| WO | 2008/032195 A2 | 3/2008 |

* cited by examiner

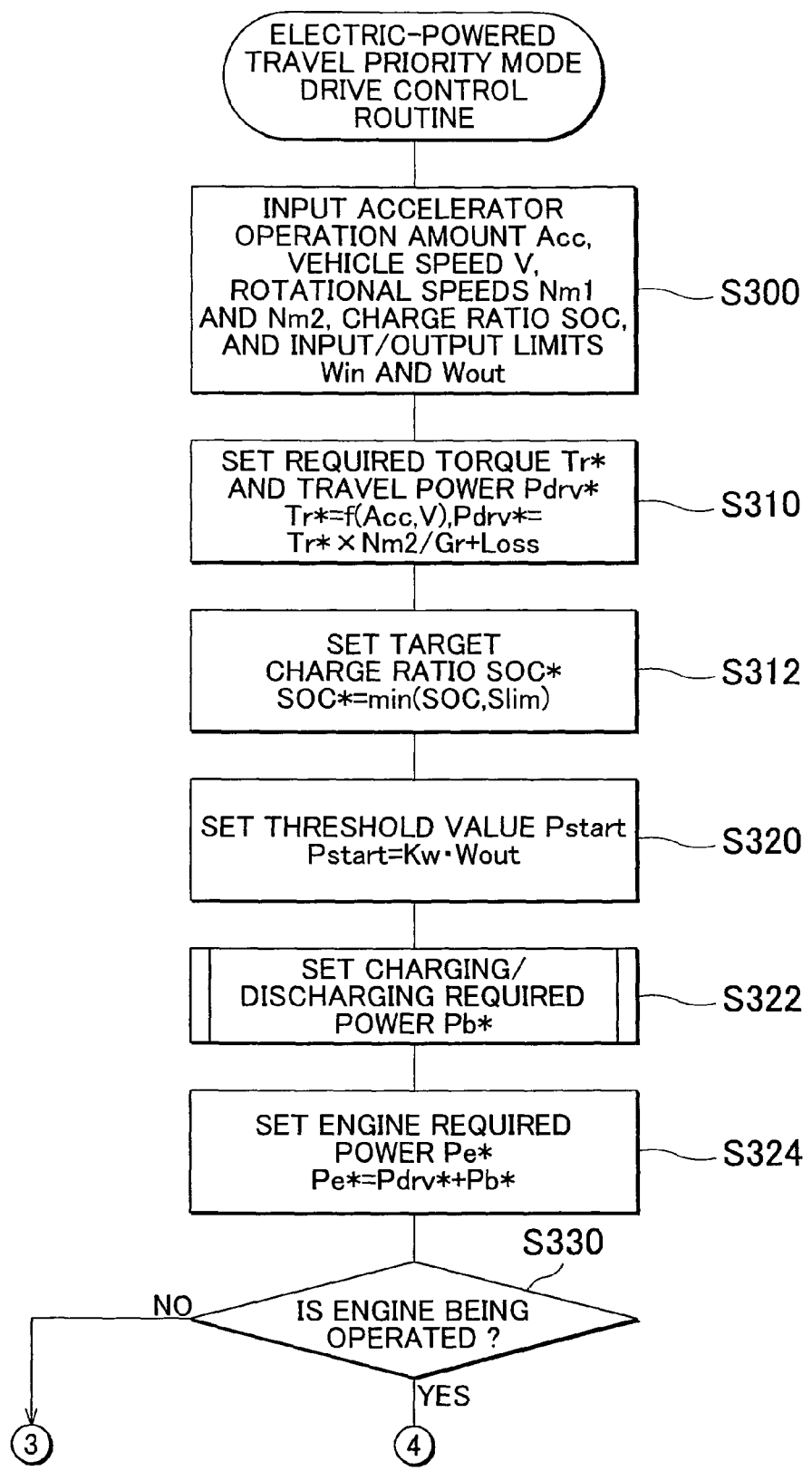

HYBRID VEHICLE AND CONTROL METHOD FOR THE SAME

BACKGROUND OF THE INVENTION

1. Field of the Invention

The invention relates to a hybrid vehicle and a control method for the same. More specifically, the invention relates to a hybrid vehicle that travels using only power input to and output from a motor in an electric-powered travel mode, and travels using power output from an internal combustion engine and the power input to and output from the motor in a hybrid travel mode, and a control method for the same.

2. Description of Related Art

Japanese Patent Application Publication No. 2007-62640 (JP-A-2007-62640) describes an example of the hybrid vehicle. In the publication No. 2007-62640, when a target state of charge (SOC), which is the target state of charge of a secondary battery, is set, the hybrid vehicle travels in an HV mode where only power from a motor is used and an engine is stopped until the state of charge (SOC) of the secondary battery reaches the target SOC. After the SOC of the secondary battery reaches the target SOC, the hybrid vehicle travels in an HV mode where power from the engine and power from the motor are used. When the hybrid vehicle travels in the HV mode, the charging/discharging of the secondary battery is controlled so that the SOC of the secondary battery is equal to the target SOC. As a result, when the hybrid vehicle reaches a destination, the SOC of the secondary battery is equal to the target SOC. Thus, it is possible to set the target SOC taking into account the usage of electric power at the destination.

Recently, a so-called plug-in hybrid vehicle has been proposed. In the plug-in hybrid vehicle, while a system is in a stopped state, a secondary battery, which supplies electric power to a motor, is connected to an external power source, and is charged with electric power from the external power source. In the plug-m hybrid vehicle, each time the system is to be started, the secondary battery is charged. Therefore, in order to decrease the amount of electricity stored in the secondary battery (hereinafter, referred to as "charge amount") by the time when the system is stopped, the hybrid vehicle generally travels with priority being given to an electric-powered travel mode where the engine is stopped and only the power from the motor is used. In the case where a driver depresses an accelerator pedal to a large extent and the hybrid vehicle is required to travel with large driving power while the hybrid vehicle is traveling in the electric-powered travel mode, the required driving power cannot be provided by using only the power from the motor, and therefore, a control is switched so that the engine is started and the hybrid vehicle travels with the required driving power using the power from the engine and the power from the motor. Then, when the charge amount has decreased to a certain low level, a target charge amount is set to the charge amount at that time, and thus, the charge amount of the secondary battery is maintained. In addition, the control is switched so that the hybrid vehicle travels with priority being given to a hybrid travel mode where the power from the engine and the power from the motor are used. Thus, in the plug-in hybrid vehicle, it is effective to provide a mode changeover switch that switches a travel mode between an electric-powered travel priority mode where the hybrid vehicle travels with priority being given to the electric-powered travel mode, and a hybrid travel priority mode where the hybrid vehicle travels with priority being given to the hybrid travel mode, taking into account the usage of electric power at the destination, as well as in the above-described hybrid vehicle. However, because the purposes of the travel modes are different from each other, the management of the charging/discharging of the secondary battery during the travel control in the electric-powered travel priority mode is different from the management of the charging/discharging of the secondary battery during the travel control in the hybrid travel priority mode. Therefore, when the mode changeover switch is operated while the engine is being operated, an operation point for the engine may be suddenly changed due to a sudden change in the charging/discharging of the secondary battery, and thus, a driver or an occupant may feel discomfort. Also, when the mode changeover switch is not operated but the travel mode is switched while the engine is being operated, the operation point for the engine may be suddenly changed, and thus, the driver or the occupant may feel discomfort.

SUMMARY OF THE INVENTION

The invention provides a hybrid vehicle and a control method for the same, which suppress a sudden change in an operation point for an internal combustion engine when an execution travel mode is switched while the internal combustion engine is being operated.

A first aspect of the invention relates to a hybrid vehicle that includes an internal combustion engine that outputs power for travel; a motor to and from which power for travel is input and output; and a secondary battery that transmits and receives electric power to and from the motor. The hybrid vehicle travels using only the power input to and output from the motor in an electric-powered travel mode, and the hybrid vehicle travels using the power output from the internal combustion engine and the power input to and output from the motor in a hybrid travel mode. The hybrid vehicle includes a mode setting portion that sets an execution travel mode to one of two travel modes including an electric-powered travel priority mode where the hybrid vehicle travels with priority being given to the electric-powered travel mode over the hybrid travel mode, and a hybrid travel priority mode where the hybrid vehicle travels with priority being given to the hybrid travel mode over the electric-powered travel mode; and a control portion that, when the execution travel mode is switched by the mode setting portion while the internal combustion engine is being operated, controls the internal combustion engine and the motor so that charging/discharging electric power for charging or discharging the secondary battery is gradually changed and the hybrid vehicle travels in the switched execution travel mode.

In the hybrid vehicle according to the first aspect of the invention, when the execution travel mode is switched while the internal combustion engine is being operated, the internal combustion engine and the motor are controlled so that the charging/discharging electric power for charging or discharging the secondary battery is gradually changed and the hybrid vehicle travels in the switched execution travel mode. Thus, it is possible to suppress a sudden change in the charging/discharging electric power for charging or discharging the secondary battery. Accordingly, it is possible to suppress a sudden change in an operation point for the internal combustion engine. As a result, it is possible to reduce the possibility that a driver or an occupant feels discomfort due to the sudden change in the operation point for the internal combustion engine. Note that the operation point for the internal combustion engine includes an operation point indicated by the rotational speed and the output torque of the internal combustion engine, and an operation point indicated by the rotational speed and the output power of the internal combustion engine.

The hybrid vehicle according to the above-described aspect may further include a mode selection switch that is operated by an operator to select one of the two travel modes including the electric-powered travel priority mode and the hybrid travel priority mode, wherein the mode setting portion may set the execution travel mode to the travel mode selected by the mode selection switch. With this configuration, the operator sets the execution travel mode to the desired travel mode using the mode selection switch, and the hybrid vehicle travels in the set execution travel mode.

The hybrid vehicle according to the above-described aspect may further include a charge ratio calculation portion that calculates a charge ratio that is a ratio of an amount of electricity stored in the secondary battery to an entire capacity of the secondary battery, based on a state of the secondary battery, wherein the control portion may set engine required power that is to be output from the internal combustion engine, based on a sum of travel power that is required for travel based on an accelerator operation, and charging/discharging required power that is required for charging or discharging the secondary battery based on the calculated charge ratio, and the control portion may control the internal combustion engine and the motor so that the set engine required power is output from the internal combustion engine under a predetermined restriction imposed on an operation of the internal combustion engine and the hybrid vehicle travels with the travel power; and when the execution travel mode is switched while the engine is being operated, the control portion may set and control the charging/discharging required power so that the charging/discharging required power is gradually changed to decrease a difference in the charging/discharging required power due to switching of the execution travel mode. Because the travel power is not changed when the execution travel mode is switched, it is possible to suppress a sudden change in the charging/discharging electric power for charging or discharging the secondary battery by gradually changing the charging/discharging required power. As a result, it is possible to suppress a sudden change in the operation point for the internal combustion engine, and thus, it is possible to reduce the possibility that the driver or the occupant feels discomfort due to the sudden change in the operation point for the internal combustion engine.

In the hybrid vehicle according to the above-described aspect, when the execution travel mode is switched, the control portion may control the charging/discharging required power so that the charging/discharging required power in the execution travel mode before switched is changed to the charging/discharging required power in the execution travel mode, after switched in a manner such that the charging/discharging required power is changed by predetermined power per unit time.

In the hybrid vehicle according to the aspect in which when the execution travel mode is switched while the internal combustion engine is being operated, the internal combustion engine and the motor are controlled by setting the charging/discharging required power so that the charging/discharging required power is gradually changed to decrease a difference in the charging/discharging required power due to switching of the execution travel mode, when the set execution travel mode is the electric-powered travel priority mode, the control portion may set a target charge ratio to the charge ratio that is sequentially calculated by the charge ratio calculation portion, and may set and control the charging/discharging required power so that the charge ratio calculated by the charge ratio calculation portion is equal to the target charge ratio; and when the set execution travel mode is the hybrid travel priority mode, the control portion may set and control the charging/discharging required power so that the charge ratio calculated by the charge ratio calculation portion falls within a control range whose center is the target charge ratio that is set in a predetermined manner at a time when the execution travel mode is set to the hybrid travel priority mode. In this case, the predetermined manner may be a manner in which when the execution travel mode is set to the hybrid travel priority mode due to the charge ratio, which is calculated by the charge ratio calculation portion, becoming lower than a first charge ratio below which the execution travel mode is to be set to the hybrid travel priority mode, the target charge ratio is set to a second charge ratio that is set in advance as a value equal to or higher than the first charge ratio, and when the execution travel mode is set to the hybrid travel priority mode due to a cause that is not related to the charge ratio calculated by the charge ratio calculation portion, the target charge ratio is set to the charge ratio that is calculated by the charge ratio calculation portion at the time when the execution travel mode is set to the hybrid travel priority mode. The predetermined manner may be a manner in which when the execution travel mode is set to the hybrid travel priority mode due to the charge ratio, which is calculated by the charge ratio calculation portion, becoming lower than a first charge ratio below which the execution travel mode is to be set to the hybrid travel priority mode, the target charge ratio is set to a second charge ratio that is set in advance as a value equal to or higher than the first charge ratio, and when the execution travel mode is set to the hybrid travel priority mode due to a cause that is not related to the charge ratio calculated by the charge ratio calculation portion, if the charge ratio calculated by the charge ratio calculation portion at the time when the execution travel mode is set to the hybrid travel priority mode is equal to or higher than a third charge ratio, the target charge ratio is set to the third charge ratio, and if the charge ratio calculated by the charge ratio calculation portion at the time when the execution travel mode is set to the hybrid travel priority mode is lower than the third charge ratio, the target charge ratio is set to the calculated charge ratio.

In the hybrid vehicle according to the aspect in which when the execution travel mode is switched while the internal combustion engine is being operated, the internal combustion engine and the motor are controlled by setting the charging/discharging required power so that the charging/discharging required power is gradually changed to decrease a difference in the charging/discharging required power due to switching of the execution travel mode, in a case where the internal combustion engine is operated in the hybrid travel priority mode, when the charge ratio calculated by the charge ratio calculation portion is out of a control range, the control portion may set the charging/discharging required power so as to eliminate a difference between the charge ratio and a limit value in the control range. The hybrid vehicle according to the above-described aspect may further include a charger that is connected to an external power source to charge the secondary battery with electric power from the external power source, while a system of the hybrid vehicle is stopped; and a basic travel mode setting portion that, at least when the calculated charge ratio is equal to or higher than a fourth charge ratio at a time when the system is started, sets the execution travel mode to the electric-powered travel priority mode until the calculated charge ratio becomes lower than a first charge ratio that is lower than the fourth charge ratio during traveling of the hybrid vehicle, wherein when the execution travel mode is not set to the electric-powered travel priority mode, the basic travel mode setting portion may set the execution travel mode to the hybrid travel priority mode. In this case, the hybrid vehicle according to the above-described aspect may further include a generator which transmits and receives electric power to and from the secondary battery, and to and from which power is input and output; and a planetary gear mechanism whose three rotational elements are connected to three shafts including an output shaft of the internal combustion engine, a rotational shaft of the generator, and a drive shaft connected to an axle, wherein the control portion may control the generator when controlling an operation of the internal combustion engine.

A second aspect of the invention relates to a control method for a hybrid vehicle that includes an internal combustion engine that outputs power for travel; a motor to and from which power for travel is input and output; and a secondary battery that transmits and receives electric power to and from the motor, wherein the hybrid vehicle travels using only the power input to and output from the motor in an electric-powered travel mode, and the hybrid vehicle travels using the power output from the internal combustion engine and the power input to and output from the motor in a hybrid travel mode. The control method includes setting an execution travel mode to one of two travel modes including an electric-powered travel priority mode where the hybrid vehicle travels with priority being given to the electric-powered travel mode over the hybrid travel mode, and a hybrid travel priority mode where the hybrid vehicle travels with priority being given to the hybrid travel mode over the electric-powered travel mode; and controlling the internal combustion engine and the motor so that the hybrid vehicle travels in the set execution travel mode, wherein when the execution travel mode is switched while the internal combustion engine is being operated, the internal combustion engine and the motor are controlled so that charging/discharging electric power for charging or discharging the secondary battery is gradually changed and the hybrid vehicle travels in the switched execution travel mode.

In the control method according to the second aspect of the invention, when the execution travel mode is switched while the internal combustion engine is being operated, the internal combustion engine and the motor are controlled so that the charging/discharging electric power for charging or discharging the secondary battery is gradually changed and the hybrid vehicle travels in the switched execution travel mode. Thus, it is possible to suppress a sudden change in the charging/discharging electric power for charging or discharging the secondary battery. Accordingly, it is possible to suppress a sudden change in the operation point for the internal combustion engine. As a result, it is possible to reduce the possibility that the driver or the occupant feels discomfort due to the sudden change in the operation point for the internal combustion engine. Note that the operation point for the internal combustion engine includes the operation point indicated by the rotational speed and the output torque of the internal combustion engine, and the operation point indicated by the rotational speed and the output power of the internal combustion engine.

In the control method according to the above-described aspect, engine required power that is to be output from the internal combustion engine may be set based on a sum of travel power that is required for travel, and charging/discharging required power that is required for charging or discharging the secondary battery based on a charge ratio that is a ratio of an amount of electricity stored in the secondary battery to an entire capacity of the secondary battery; the internal combustion engine and the motor may be controlled so that the set engine required power is output from the internal combustion engine under a predetermined restriction imposed on an operation of the internal combustion engine and the hybrid vehicle travels with the travel power; and when the execution travel mode is switched while the engine is being operated, the charging/discharging required power may be set and controlled so that the charging/discharging required power is gradually changed to decrease a difference in the charging/discharging required power due to switching of the execution travel mode. Because the travel power is not changed when the execution travel mode is switched, it is possible to suppress a sudden change in the charging/discharging electric power for charging or discharging the secondary battery by gradually changing the charging/discharging required power. As a result, it is possible to suppress a sudden change in the operation point for the internal combustion engine, and thus, it is possible to reduce the possibility that the driver or the occupant feels discomfort due to the sudden change in the operation point for the internal combustion engine.

In the control method according to the above-described aspect, when the execution travel mode is switched, the charging/discharging required power may be controlled so that the charging/discharging required power in the execution travel mode before switched is changed to the charging/discharging required power in the execution travel mode after switched in a manner such that the charging/discharging required power is changed by predetermined power per unit time.

In the control method according to the aspect in which when the execution travel mode is switched while the internal combustion engine is being operated, the internal combustion engine and the motor are controlled by setting the charging/discharging required power so that the charging/discharging required power is gradually changed to decrease a difference in the charging/discharging required power due to switching of the execution travel mode, when the set execution travel mode is the electric-powered travel priority mode, a target charge ratio may be set to the charge ratio that is sequentially calculated, and the charging/discharging required power may be set and controlled so that the calculated charge ratio is equal to the target charge ratio, and when the set execution travel mode is the hybrid travel priority mode, the charging/discharging required power may be set and controlled so that the calculated charge ratio falls within a control range whose center is the target charge ratio that is set in a predetermined manner at a time when the execution travel mode is set to the hybrid travel priority mode. In this case, the predetermined manner may be a manner in which when the execution travel mode is set to the hybrid travel priority mode due to the calculated charge ratio becoming lower than a first charge ratio below which the execution travel mode is to be set to the hybrid travel priority mode, the target charge ratio is set to a second charge ratio that is set in advance as a value equal to or higher than the first charge ratio, and when the execution travel mode is set to the hybrid travel priority mode due to a cause that is not related to the calculated charge ratio, the target charge ratio is set to the charge ratio that is calculated at the time when the execution travel mode is set to the hybrid travel priority mode. The predetermined manner may be a manner in which when the execution travel mode is set to the hybrid travel priority mode due to the calculated charge ratio becoming lower than a first charge ratio below which the execution travel mode is to be set to the hybrid travel priority mode, the target charge ratio is set to a second charge ratio that is set in advance as a value equal to or higher than the first charge ratio, and when the execution travel mode is set to the hybrid travel priority mode due to a cause that is not related to the calculated charge ratio, if the charge ratio calculated at the time when the execution travel mode is set to the hybrid travel priority mode is equal to or higher than a third charge ratio, the target charge ratio is set to the third charge ratio, and if the charge ratio calculated at the time when the execution travel mode is set to the hybrid travel priority mode is lower than the third charge ratio, the target charge ratio is set to the calculated charge ratio.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 5A and 5B show a flowchart showing an example of an electric-powered travel priority mode drive control routine executed by the hybrid electronic control unit;

DETAILED DESCRIPTION OF EMBODIMENTS

Figure 1:
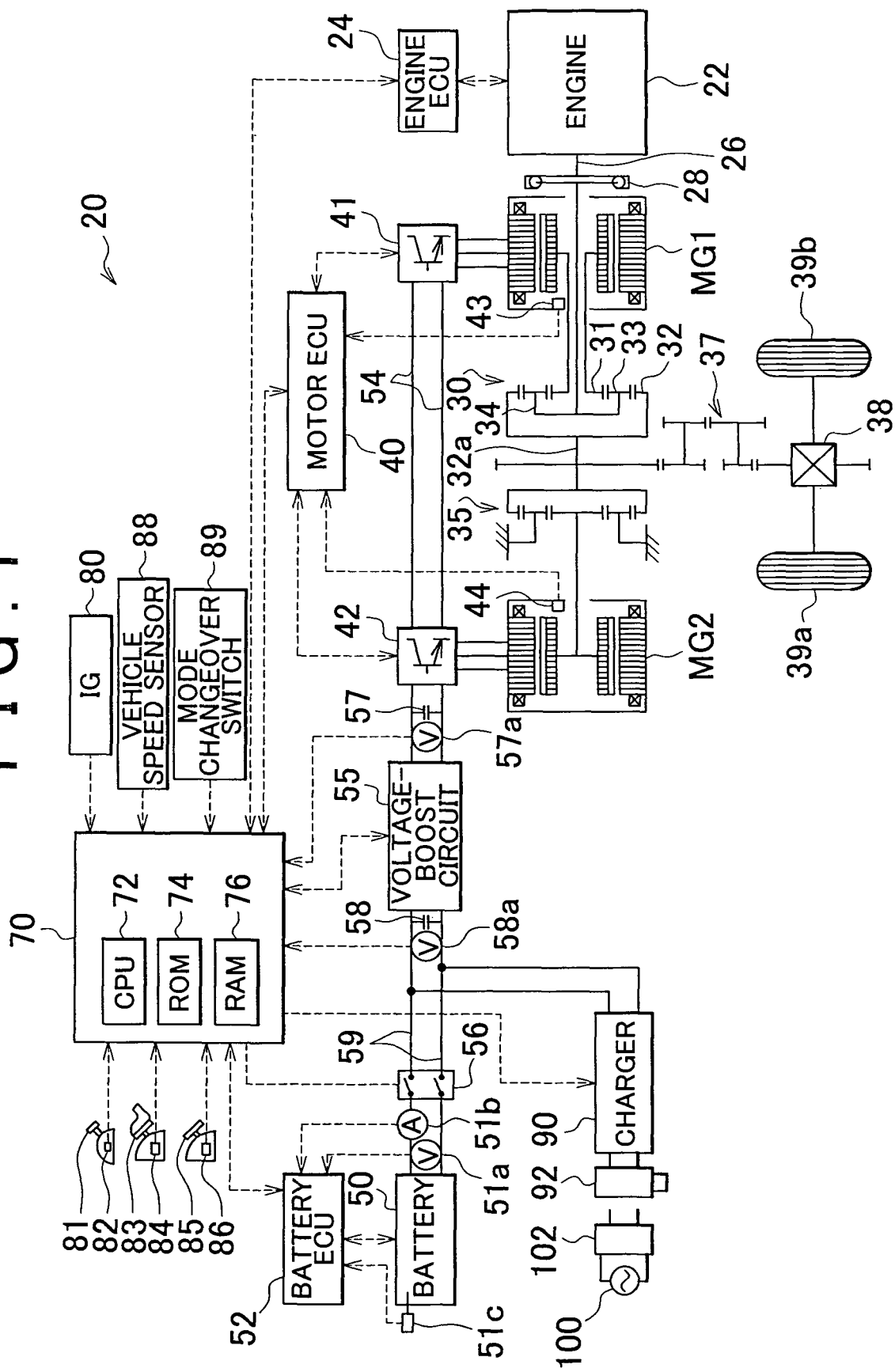
FIG. 1 is a configuration diagram showing the schematic configuration of a hybrid vehicle according to an embodiment of the invention.

An embodiment of the invention will be described with reference to the drawings. FIG. 1 is a configuration diagram showing the schematic configuration of a hybrid vehicle 20 according to the embodiment of the invention. As shown in FIG. 1, the hybrid vehicle 20 according to the embodiment includes an engine 22, a three-axis power split/integration mechanism 30, a motor MG1, a motor MG2, inverters 41 and 42, a battery 50, a voltage-boost circuit 55, a system main relay 56, a charger 90, and a hybrid electronic control unit (hereinafter, referred to as "hybrid ECU") 70. The engine 22 is configured as an internal combustion engine that outputs power using, for example, hydrocarbon fuel such as gasoline or light oil. The power split/integration mechanism 30 is configured as a planetary gear mechanism. In the power split/integration mechanism 30, a carrier 34 is coupled to a plurality of pinions 33, and is connected to a crankshaft 26 that is an output shaft of the engine 22 through a damper 28, and a ring gear 32 is connected to a ring gear shaft 32a that is a drive shaft connected to drive wheels 39a and 39b (i.e., to an axle) through a gear mechanism 37 and a differential gear 38. The motor MG1 is configured as, for example, a known synchronous motor-generator, and a rotor of the motor MG1 (i.e., a rotational shaft of the motor MG1) is connected to a sun gear 31 of the power split/integration mechanism 30. The motor MG2 is configured as, for example, a known synchronous motor-generator, and a rotor of the motor MG2 is connected to the ring gear shaft 32a through a speed-reducing gear 35. The inverters 41 and 42 drive the motors MG1 and MG2, respectively. The battery 50 is configured as, for example, a lithium ion secondary battery. The voltage-boost circuit 55 is configured as, for example, a known voltage-boost converter that boosts the voltage of electric power supplied from the battery 50, and supplies the electric power whose voltage has been boosted, to the inverters 41 and 42. The system main relay 56 connects the battery 50 to the voltage-boost circuit 55, and disconnects the battery 50 from the voltage-boost circuit 55. The charger 90 is attached to low-voltage system power lines 59 disposed on a side of the voltage-boost circuit 55, where the system main relay 56 is disposed. The charger 90 converts alternating-current power (AC power) supplied from an external power source 100, to direct-current power (DC power), and charges the battery 50 with the DC power. The hybrid ECU 70 controls the entire hybrid vehicle 20.

Figure 2:
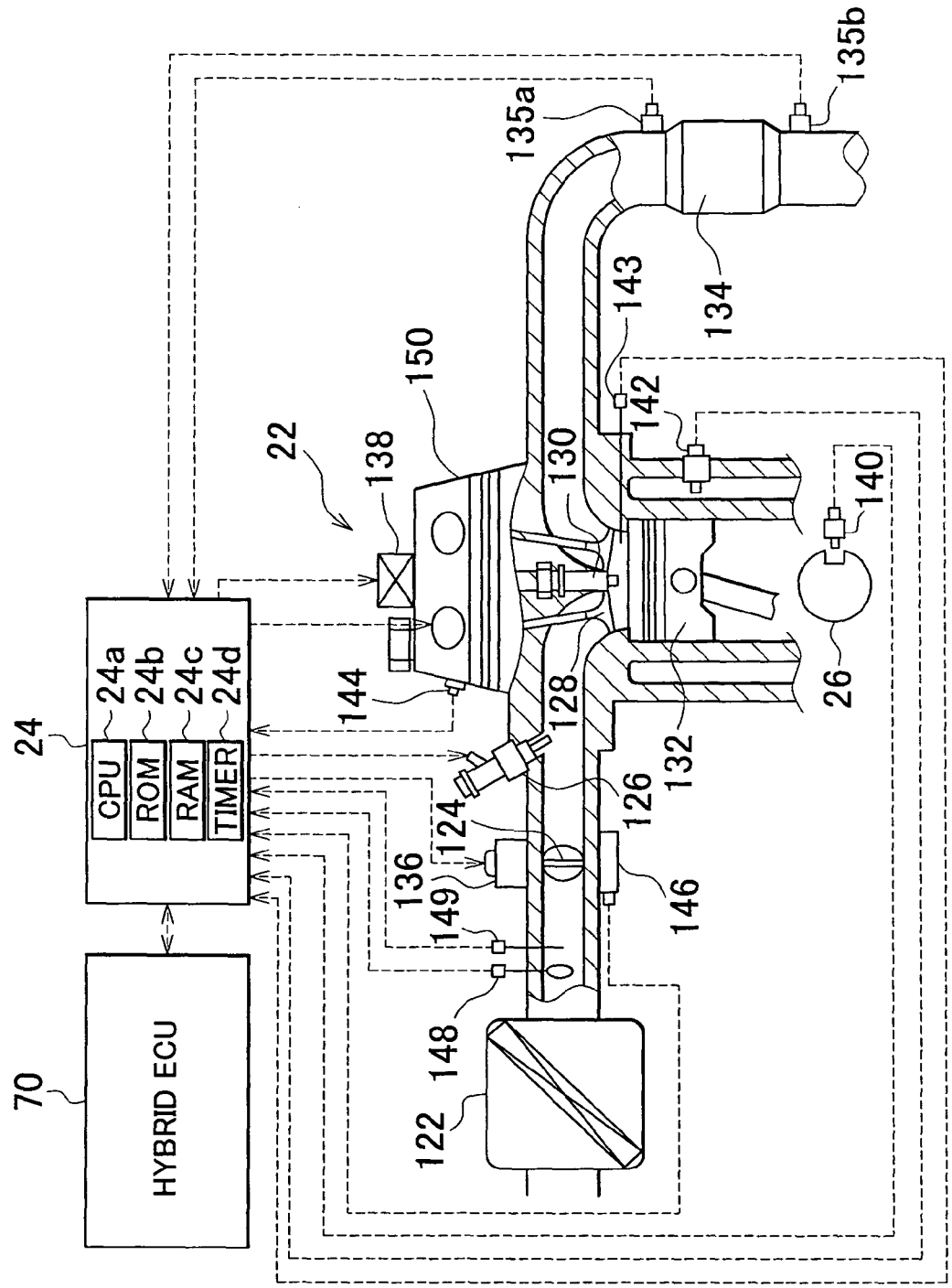
FIG. 2 is a configuration diagram showing the schematic configuration of an engine.

As shown in FIG. 2, air purified by an air cleaner 122 is taken into the engine 22 through a throttle valve 124, and is mixed with gasoline injected from a fuel injection valve 126 to generate air-fuel mixture. In the engine 22, the air-fuel mixture is taken into a combustion chamber through an intake valve 128, the air-fuel mixture is combusted using an electric spark generated by an ignition plug 130, and a piston 132 is moved downward by energy of the combustion. In the engine 22, the reciprocating movement of the piston 132 is converted to the rotational movement of the crankshaft 26. Exhaust gas discharged from the engine 22 is discharged to the outside through a purification device (three-way catalyst) 134 that purifies carbon monoxide (CO), carbon hydride (HC), and nitrogen oxide (NOx).

The engine 22 is controlled by an engine electronic control unit (hereinafter, referred to as "engine ECU") 24. The engine ECU 24 is configured as a microprocessor that mainly includes a CPU 24a. The engine ECU 24 further includes a ROM 24b that stores processing programs, a RAM 24c that temporarily stores data, a timer 24d that measures time, and input/output ports (not shown) and a communication port (not shown), in addition to the CPU 24a. The engine ECU 24 receives signals from sensors that detect the state of the engine 22 through the input port. For example, the engine ECU 24 receives, through the input port, a signal indicating a crank position from a crank position sensor 140 that detects the rotational position of the crankshaft 26; a signal indicating a coolant temperature Tw from a coolant temperature sensor 142 that detects the temperature of a coolant in the engine 22; a signal indicating a cylinder pressure Pin from a pressure sensor 143 attached to the inside of the combustion chamber; a signal indicating a cam position from a cam position sensor 144 that detects the rotational position of a camshaft that opens/closes the intake valve 128 through which the air-fuel mixture is taken, and an exhaust valve through which exhaust gas is discharged; a signal indicating a throttle position from a throttle valve position sensor 146 that detects the position of the throttle valve 124; an airflow meter signal AF from an airflow meter 148 attached to an intake air pipe; a signal indicating an intake air temperature from a temperature sensor 149 attached to the intake pipe; a signal indicating an air-fuel ratio AF from an air-fuel ratio sensor 135a; and an oxygen signal from an oxygen sensor 135b. Also, the engine ECU 24 outputs control signals for driving the engine 22, through the output port. For example, the engine ECU 24 outputs, through the output port, a drive signal for the fuel injection valve 126; a drive signal for a throttle motor 136 that adjusts the position of the throttle valve 124; a control signal for an ignition coil 138 integrated with an igniter; and a control signal for a variable valve timing mechanism 150 that changes opening/closing timings of the intake valve 128. The engine ECU 24 communicates with the hybrid ECU 70. The engine ECU 24 controls the operation of the engine 22 based on control signals transmitted from the hybrid ECU 70. In addition, the engine ECU 24 outputs data relating to the operating state of the engine 22 as needed. Also, the engine ECU 24 calculates the rotational speed of the crankshaft 26, that is, a rotational speed Ne of the engine 22 based on the crank position transmitted from the crank position sensor 140.

Drive controls for the motors MG1 and MG2 are executed by a motor electronic control unit (hereinafter, referred to as "motor ECU") 40. The motor ECU 40 receives signals necessary for executing the drive controls for the motor MG1 and the motor MG2. For example, the motor ECU 40 receives signals from rotational position detection sensors 43 and 44 that detect the rotational positions of the rotors of the motors MG1 and MG2, respectively; and signals indicating phase electric currents that are applied to the motors MG1 and MG2, and detected by electric current sensors (not shown). The motor ECU 40 outputs switching control signals for the inverters 41 and 42. The motor ECU 40 communicates with the hybrid ECU 70. The motor ECU 40 executes the drive controls for the motors MG1 and MG2 based on control signals transmitted from the hybrid ECU 70. In addition, the motor ECU 40 outputs data relating to the operating states of the motors MG1 and MG2 to the hybrid ECU 70 as needed. Also, the motor ECU 40 calculates rotational speeds Nm1 and Nm2 of the motors MG1 and MG2 based on signals from the rotational position detection sensors 43 and 44.

The battery 50 is controlled by a battery electronic control unit (hereinafter, referred to as "battery ECU") 52. The battery ECU 52 receives signals necessary for controlling the battery 50. For example, the battery ECU 52 receives a signal indicating an inter-terminal voltage V1) from a voltage sensor 51a provided between terminals of the battery 50; a signal indicating a charging/discharging electric current Ib from an electric current sensor 51b attached to an output terminal on a positive side of the battery 50; and a signal indicating a battery temperature Tb from a temperature sensor 51c attached to the battery 50. The battery ECU 52 outputs data relating to the state of the battery 50 to the hybrid ECU 70 through communication, as needed. Also, in order to control the battery 50, the battery ECU 52 calculates a charge ratio SOC based on an accumulated value of the charging/discharging electric current Ib detected by the electric current sensor 51b, and calculates an input limit Win and an output limit Wout based on the calculated charge ratio SOC and the battery temperature Tb. The charge ratio SOC is the ratio of the amount of electricity that can be discharged from the battery 50, to the entire capacity of the battery 50. The input limit Win is the maximum permissible electric power with which the battery 50 may be charged. The output limit Wout is the maximum permissible electric power that may be discharged from the battery 50. The input limit Win and the output limit Wout for the battery 50 may be set by setting basic values of the input limit Win and the output limit Wout based on the battery temperature Tb, setting an input limit correction coefficient and an output limit correction coefficient based on the charge ratio SOC of the battery 50, and multiplying the set basic values of the input limit Win and the output limit Wout by the respective correction coefficients.

A vehicle-side connector 92 of the charger 90 is connected to an external power source-side connector 102 of the external power source 100. Thus, the charger 90 charges the battery 50 with electric power supplied from the external power source 100. The charger 90 includes a charging relay (not shown) that connects the vehicle-side connector 92 and the low-voltage system power lines 59, and disconnects the vehicle-side connector 92 from the low-voltage system power lines 59; an AC/DC converter that converts AC power supplied from the external power source 100 to DC power; and a DC/DC converter that converts the voltage of the DC power to which the AC power has been converted by the AC/DC converter, and supplies the DC power whose voltage has been converted, to the low-voltage system power lines 59.

The hybrid ECU 70 is configured as a microprocessor that mainly includes a CPU 72. The hybrid ECU 70 further includes a ROM 74 that stores processing programs, a RAM 76 that temporarily stores data, input/output ports (not shown), and a communication port (not shown), in addition to the CPU 72. For example, the hybrid ECU 70 receives, through the input port, a signal indicating a voltage (i.e., a voltage in a high-voltage system) VH from a voltage sensor 57a attached between terminals of a capacitor 57 attached to high-voltage system power lines 54 disposed on a side of the voltage-boost circuit 55, where the inverters 41 and 42 are disposed; a signal indicating a voltage (i.e., a voltage in a low-voltage system) VL from a voltage sensor 58a attached between terminals of a capacitor 58 attached to the low-voltage system power lines 59; an ignition signal from an ignition switch 80; a signal indicating a shift position SP from a shift position sensor 82 that detects the operational position of a shift lever 81; a signal indicating an accelerator operation amount Acc from an accelerator pedal position sensor 84 that detects the amount of depression of an accelerator pedal 83; a signal indicating a brake pedal position BP from a brake pedal position sensor 86 that detects the amount of depression of a brake pedal 85; a signal indicating a vehicle speed V from a vehicle speed sensor 88; and a signal indicating a mode changeover switch state SW from a mode changeover switch 89 that is attached to a position near a driver's seat in a vehicle compartment, and switches an execution travel mode between an electric-powered travel priority mode and a hybrid travel priority mode. For example, the hybrid ECU 70 outputs a switching control signal for switching elements in the voltage-boost circuit, a drive signal for the system main relay 56, a control signal for the charger 90, through the output port. The hybrid ECU 70 is connected to the engine ECU 24, the motor ECU 40, and the battery ECU 52 through the communication port, as described above. The control signals and data are transmitted between the hybrid ECU 70, and the engine ECU 24, the motor ECU 40, and the battery ECU 52.

The hybrid vehicle 20 according to the embodiment, which has the above-described configuration, calculates required torque based on the vehicle speed V and the accelerator operation amount Acc corresponding to the amount of depression of the accelerator pedal 83 depressed by a driver. The required torque is torque that should be output to the ring gear shaft 32a that is the drive shaft. The operations of the engine 22 and the motors MG1 and MG2 are controlled to output required power corresponding to the required torque, to the ring gear shaft 32a. Modes for the control of the operations of the engine 22 and the motors MG1 and MG2 include a torque conversion operation mode, a charging/discharging operation mode, and a motor operation mode. In the torque conversion operation mode, the operation of the engine 22 is controlled so that power corresponding to the required power is output from the engine 22, and the drive controls for the motors MG1 and MG2 are executed so that all of the power output from the engine 22 is subjected to torque conversion using the power split/integration mechanism 30 and the motors MG1 and MG2, and then is output to the ring gear shaft 32a. In the charging/discharging operation mode, the operation of the engine 22 is controlled so that power corresponding to the sum of the required power and power necessary for charging or discharging the battery 50 is output from the engine 22, and the drive controls for the motors MG1 and MG2 are executed so that the battery 50 is charged or discharged, all of or part of the power output from the engine 22 is subjected to torque conversion using the power split/integration mechanism 30 and the motors MG1 and MG2, and the required power is output to the ring gear shaft 32a. In the motor operation mode, the operation of the engine 22 is stopped, and power corresponding to the required power is output from the motor MG2 to the ring gear shaft 32a. In each of the torque conversion operation mode and the charging/discharging operation mode, the engine 22 is operated, and the operations of the engine 22 and the motors MG1 and MG2 are controlled to output the required power to the ring gear shaft 32a. Therefore, hereinafter, the torque conversion operation mode and the charging/discharging operation mode may be collectively referred to as "engine operation mode".

Figure 3:
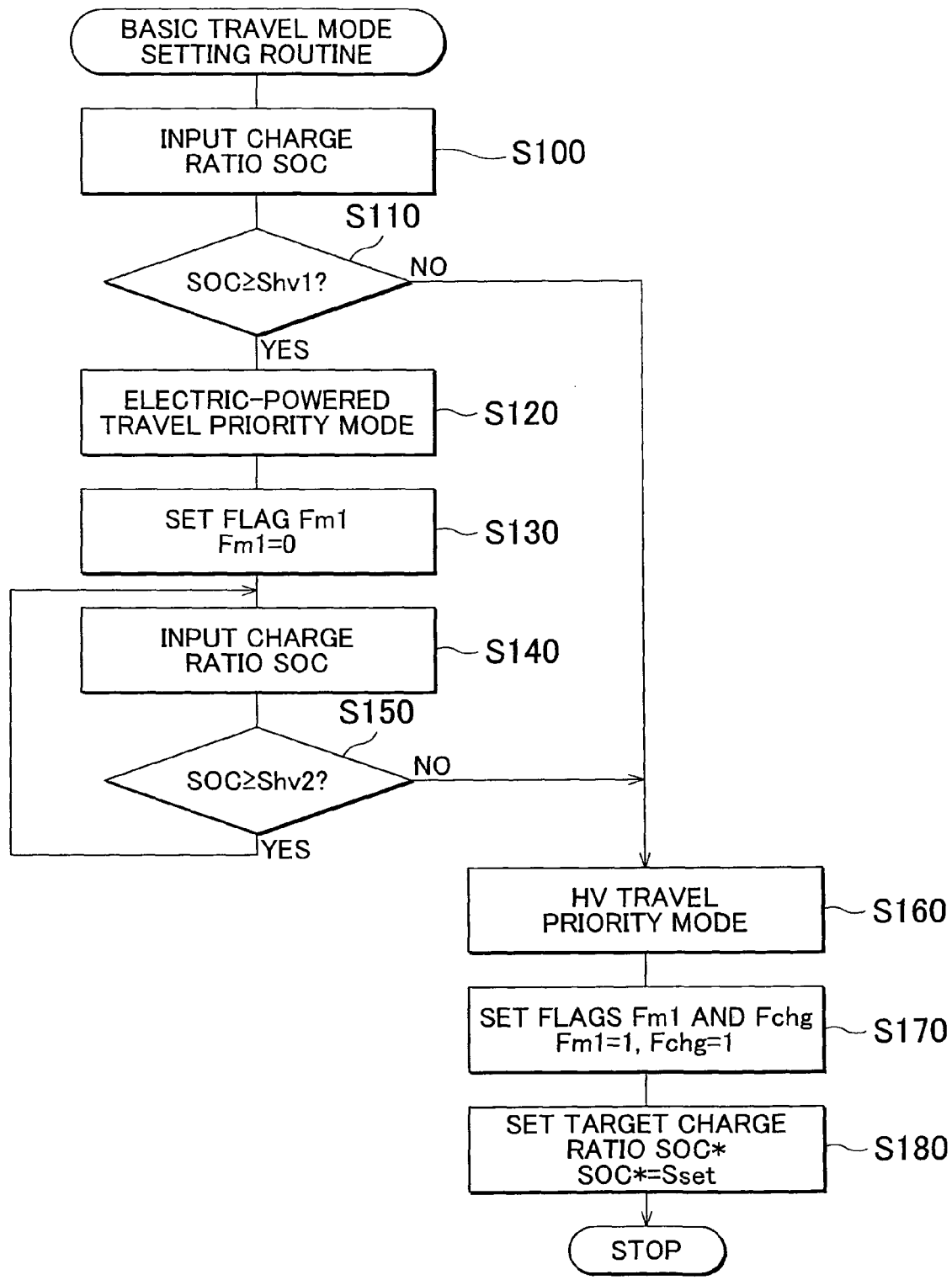
FIG. 3 is a flowchart showing an example of a basic travel mode setting routine executed by a hybrid electronic control unit.

While the hybrid vehicle 20 in the embodiment is traveling, the charging/discharging of the battery 50 is controlled so that the charge ratio SOC of the battery 50 is at a certain low level at which the engine 22 is sufficiently started when the hybrid vehicle 20 reaches a home or a predetermined charging point. After a system of the hybrid vehicle 20 is stopped at the home or the predetermined charging point, the vehicle-side connector 92 of the charger 90 is connected to the external power source-side connector 102 of the external power source 100. Then, the battery 50 is brought to a fully-charged state or a predetermined charged stated that is lower than the fully-charged state using electric power supplied from the external power source 100, by controlling the DC/DC converter (not shown) and the AC/DC converter (not shown) in the charger 90. Then, when the system is started after the battery 50 is charged, a basic travel mode setting routine shown in FIG. 3 is executed. That is, if the charge ratio SOC of the battery 50 at the time at which the system is started is equal to or higher than a predetermined threshold value Shv1 (for example, 40% or 50%) that is the charge ratio SOC at which the hybrid vehicle 20 is able to travel in an electric-powered travel mode to some degree, the execution travel mode is set to the electric-powered travel priority mode and the hybrid vehicle 20 travels in the electric-powered travel priority mode until the charge ratio SOC of the battery 50 becomes lower than a predetermined threshold value Shv2 (for example, 20% or 30%) at which the engine 22 is able to be started (steps S100 to S150), as shown in the basic travel mode setting routine in FIG. 3. In the electric-powered travel priority mode, the hybrid vehicle 20 travels with priority being given to the motor operation mode (i.e., the electric-powered travel mode). If the charge ratio SOC of the battery 50 at the time at which the system is started is lower than the threshold value Shv1, or if the charge ratio SOC of the battery 50 at the time at which the system is started is equal to or higher than the threshold value Shv1 and then the charge ratio SOC of the battery 50 becomes lower than the threshold value Shv2, the execution travel mode is set to the hybrid travel priority mode and the hybrid vehicle 20 travels in the hybrid travel priority mode (step S160). In the hybrid travel priority mode, the hybrid vehicle 20 travels with priority being given to the engine operation mode (i.e., the hybrid travel mode) (step S160). In the basic travel mode setting routine, when the execution travel mode is set to the electric-powered travel priority mode, a basic travel mode flag Fm1 is set to 0 (step S130), and when the execution travel mode is set to the hybrid travel priority mode, the basic travel mode flag Fm1 is set to 1 and a travel mode change flag Fchg is set to 1 (step S170). Further, a target charge ratio SOC* in the hybrid travel priority mode is set to a predetermined charge ratio Sset (for example, a value equal to or slightly higher than the threshold value Shv2) (step S180). The threshold value Shv2 may be regarded as "the first charge ratio" according to the invention. The predetermined charge ratio Sset may be regarded as "the second charge ratio" according to the invention. The threshold value Shv1 may be regarded as "the fourth charge ratio" according to the invention.

Figure 4:
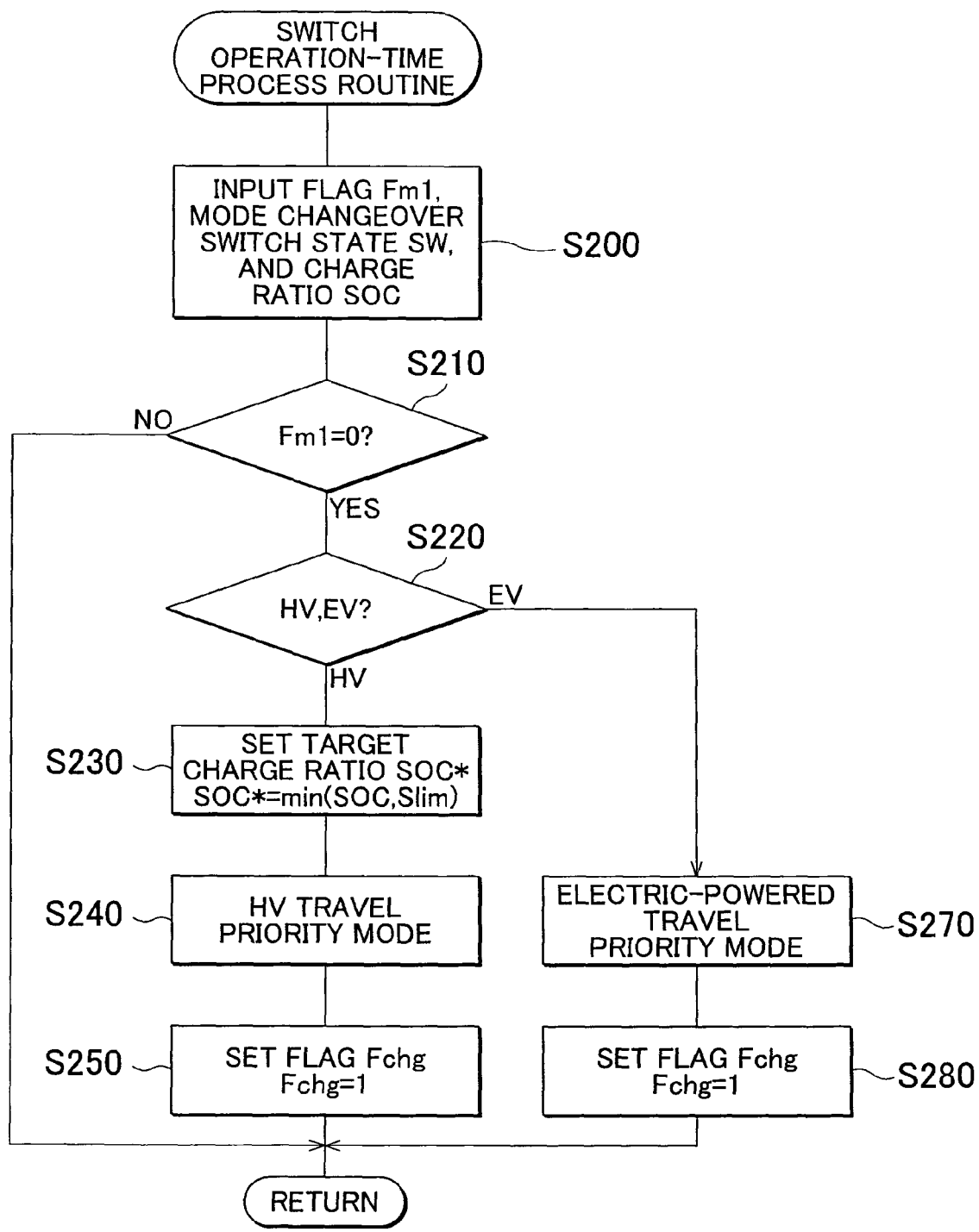
FIG. 4 is a flowchart showing an example of a switch operation-time process routine executed by the hybrid electronic control unit.

Next, descriptions will be made on a process of setting the execution travel mode when the mode changeover switch 89 is operated. FIG. 4 is a flowchart showing an example of a switch operation-time process routine that is executed by the hybrid ECU 70 when the mode changeover switch 89 is operated. When the mode changeover switch 89 is operated and the switch operation-time process routine is executed, first, the basic travel mode flag Fm1, the mode changeover switch state SW, and the charge ratio SOC are input to the CPU 72 of the hybrid ECU 70 (step S200), and the value of the basic travel mode flag Fm1 is checked (step S210). If the value of the basic travel mode flag Fm1 is 1, it is determined that the execution travel mode cannot be changed to the electric-powered travel priority mode, because the charge ratio SOC at the time of system start was lower than the threshold value Shv1 and thus the set execution travel mode is the hybrid travel priority mode, or the charge ratio SOC at the time of system start was equal to or higher than the threshold value Shv1 and then the charge ratio SOC became lower than the threshold value Shv2 and thus the set execution travel mode is the hybrid travel priority mode. Thus, the routine ends without changing the execution travel mode. If the value of the basic travel mode flag Fm1 is 0, the mode changeover switch state SW is checked (step S220). If the mode changeover switch state SW indicates switching to the hybrid travel priority mode, the target charge ratio SOC* is set to one of the input charge ratio SOC and a predetermined central upper limit value Slim (for example, 80% or 85%), which is lower than the other (step S230), the execution travel mode is set to the hybrid travel priority mode (step S240), the travel mode change flag Fchg is set to 1 (step S250), and then, the routine ends. The target charge ratio SOC* is set to one of the charge ratio SOC and the central upper limit value Slim, which is lower than the other, for the following reason. In order to travel with high energy efficiency in the hybrid travel priority mode, electric energy should be stored using, for example, regenerative brake, and therefore, the charge ratio SOC should be controlled to a certain low level. If the mode changeover switch state SW indicates switching to the electric-powered travel priority mode, the execution travel mode is set to the electric-powered travel priority mode (step S270), the travel mode change flag Fchg is set to 1 (step S280), and then, the routine ends. The central upper limit value Slim may be regarded as "the third charge ratio" according to the invention.

Figure 5B:
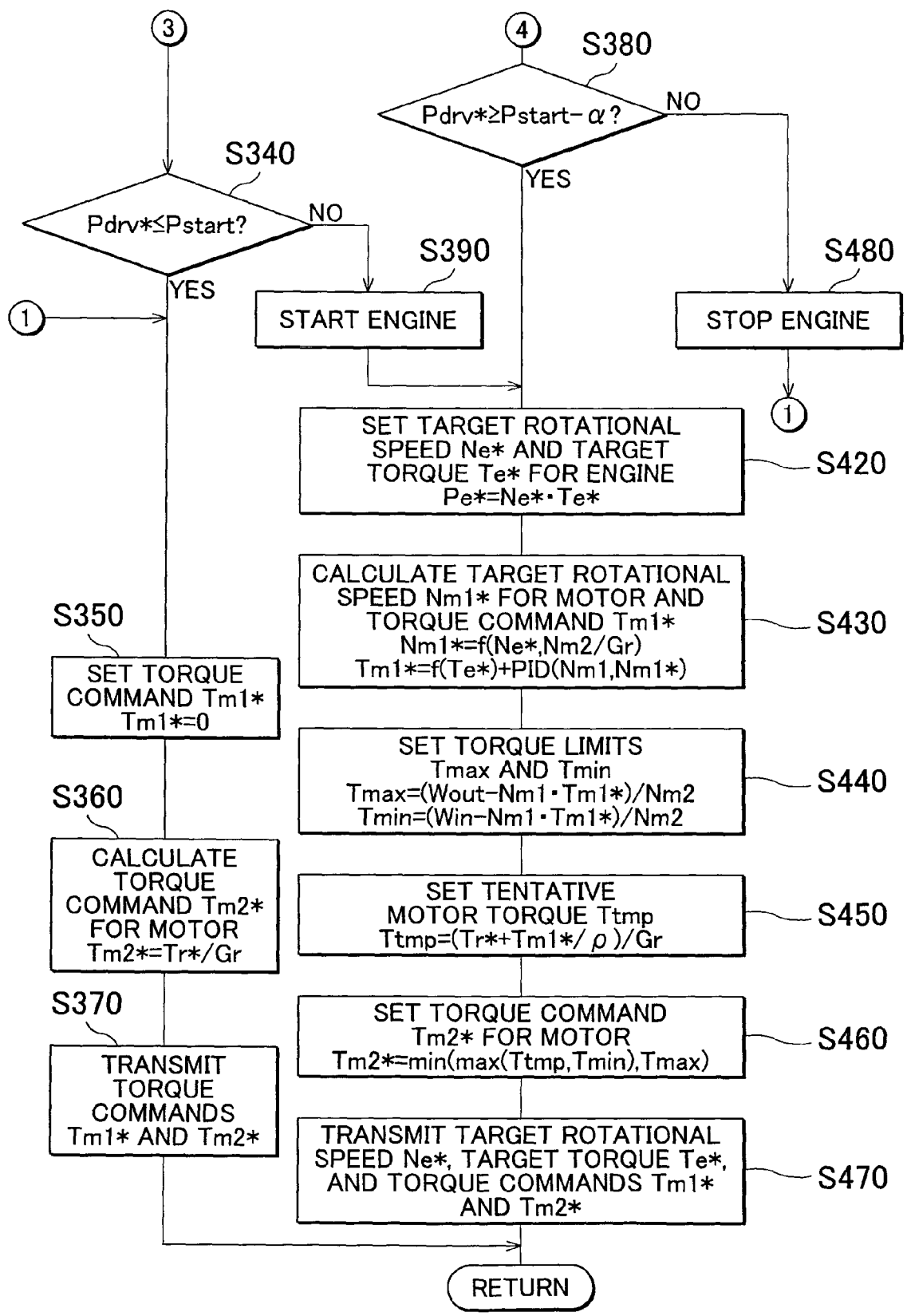
Figure 6A:
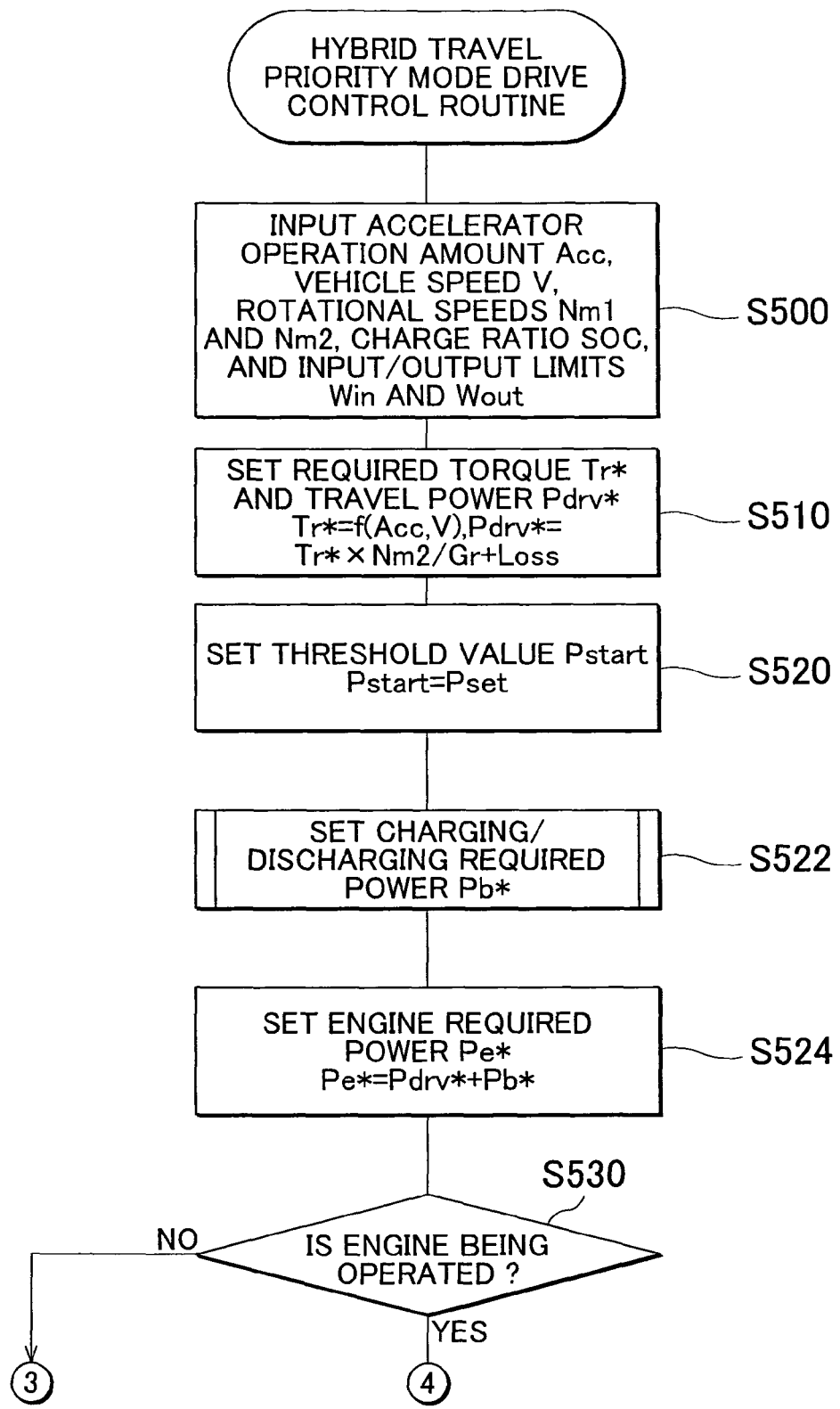
FIGS. 6A and 6B show a flowchart showing an example of a hybrid travel priority mode drive control routine executed by the hybrid electronic control unit.
Figure 6B:
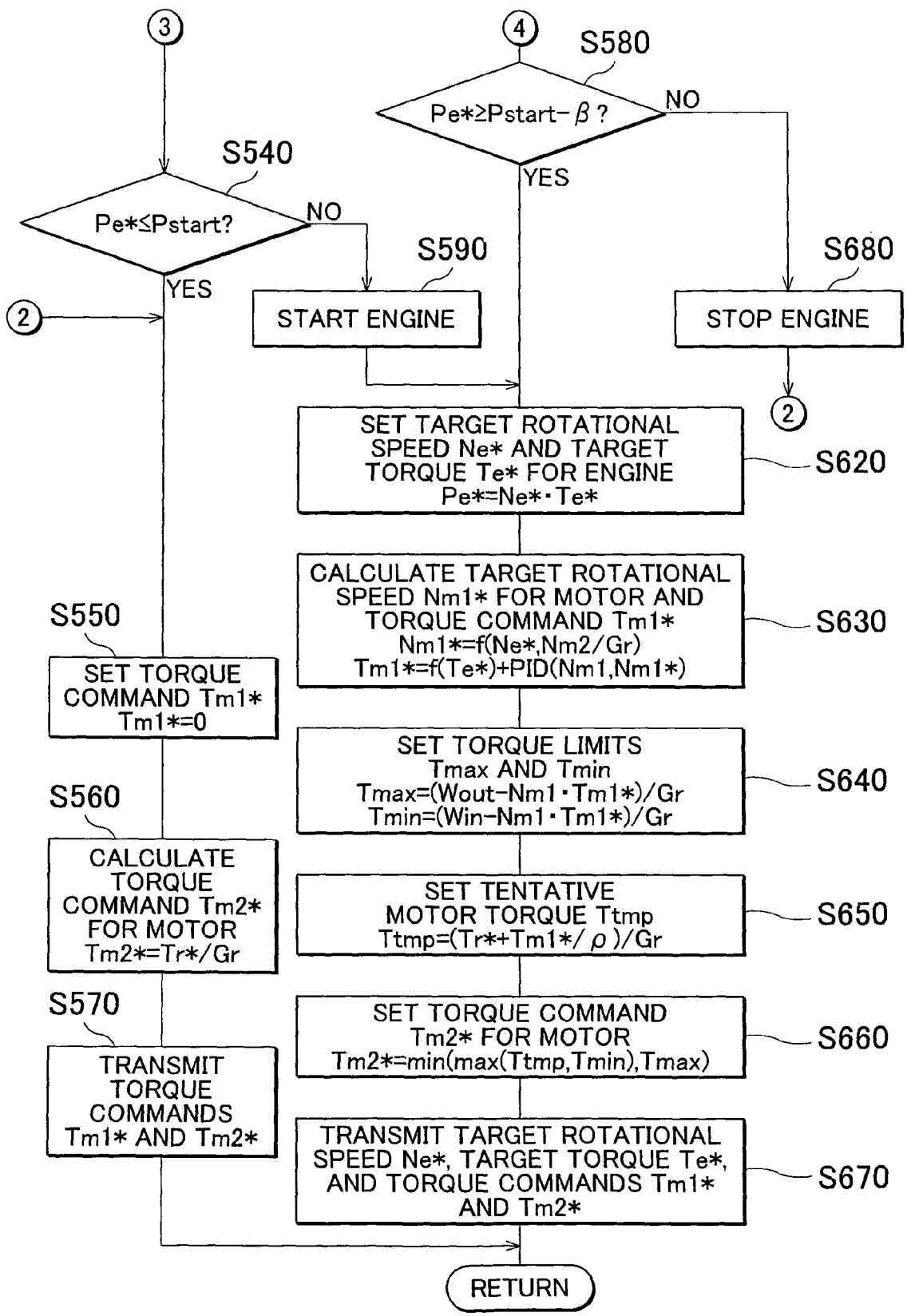

Next, descriptions will be made on operations executed while the hybrid vehicle 20 is traveling in the electric-powered travel priority mode or the hybrid travel priority mode, and operations executed when the execution travel mode is switched. FIGS. 5A and 5B show a flowchart showing an example of an electric-powered travel priority mode drive control routine executed by the hybrid ECU 70 when the set execution travel mode is the electric-powered travel priority mode. FIGS. 6A and 6B show a flowchart showing an example of a hybrid travel priority mode drive control routine executed by the hybrid ECU 70 when the set execution travel mode is the hybrid travel priority mode. Each of these routines is repeatedly executed at predetermined time intervals (for example, at time intervals of several msec) when the execution travel mode has been set to the corresponding mode. First, descriptions will be made on the drive control executed while the hybrid vehicle 20 is traveling in the electric-powered travel priority mode. Then, descriptions will be made on the drive control executed while the hybrid vehicle 20 is traveling in the hybrid travel priority mode. Then, descriptions will be made on the operations executed when the execution travel mode is switched.

When the electric-powered travel priority mode drive control routine shown in FIGS. 5A and 5B is executed, first, the CPU 72 of the hybrid ECU 70 executes a process of receiving data necessary for the control, such as the accelerator operation amount Acc from the accelerator pedal position sensor 84, the vehicle speed V from the vehicle speed sensor 88, the rotational speeds Nm1 and Nm2 of the motors MG1 and MG2, the charge ratio SOC of the battery 50, and the input limit Win and the output limit Wout for the battery 50 (step S300). The rotational speeds Nm1 and Nm2 of the motors MG1 and MG2 are calculated based on the rotational positions of the rotors of the motors MG1 and MG2 detected by the rotational position detection sensors 43 and 44, and are input to the hybrid ECU 70 from the motor ECU 40 through communication. Also, the charge ratio SOC of the battery 50 is calculated based on the accumulated value of the charging/discharging electric current Ib flowing to/from the battery 50 detected by the electric current sensor 51$b$, and is input to the hybrid ECU 70 from the battery ECU 52 through communication. Further, the input limit Win and the output limit Wout for the battery 50 are set based on the battery temperature Tb of the battery 50 and the charge ratio SOC of the battery 50, and is input to the hybrid ECU 70 from the battery ECU 52 through communication.

Figure 7:
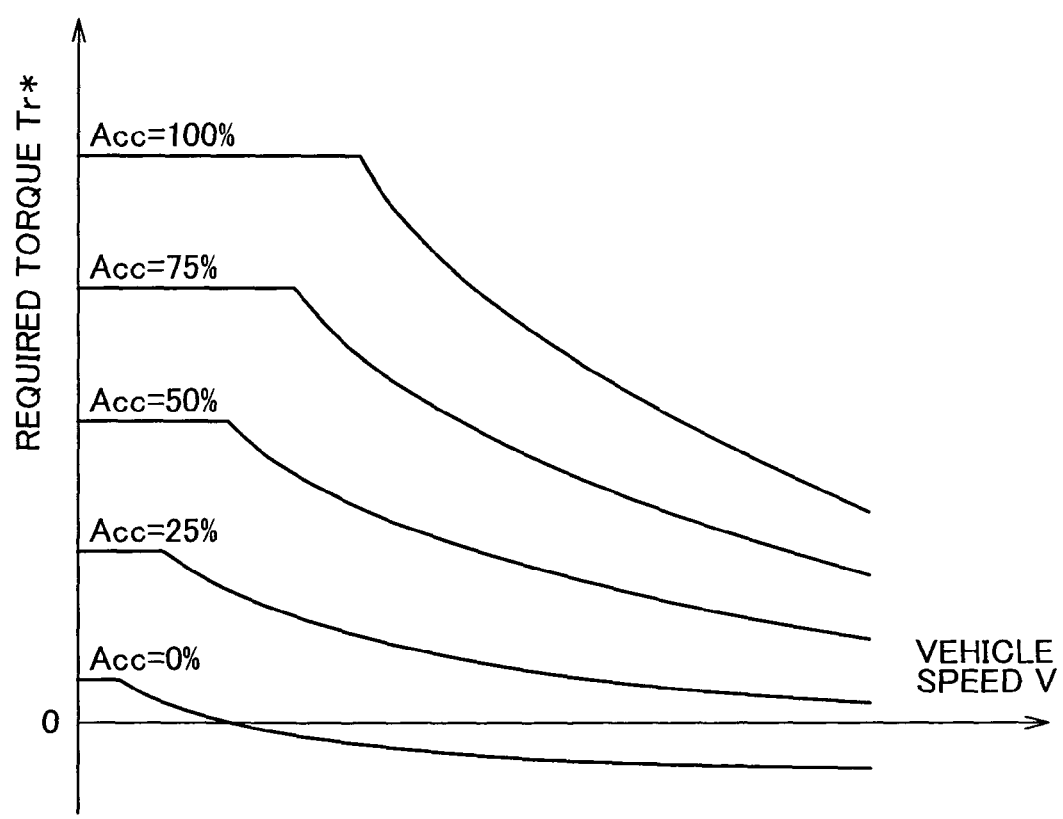
FIG. 7 is an explanatory diagram showing an example of a required torque setting map.

After the data is input to the hybrid ECU 70 in the above-described manner, required torque Tr* that is required to be output to the ring gear shaft 32$a$ is set as torque required by the vehicle, based on the input accelerator operation amount Acc and the input vehicle speed V, and travel power Pdrv* that is required for travel by the vehicle is set (step S310). The ring gear shaft 32$a$ is the drive shaft connected to the drive wheels 39$a$ and 39$b$. Then, the target charge ratio SOC* is set to one of the input charge ratio SOC and the predetermined central upper limit value Slim, which is lower than the other (step S312), and a threshold value Pstart is set to a value obtained by multiplying the output limit Wout for the battery 50 by a conversion coefficient kw used to convert electric power to power of a drive system (step S320). The threshold value Pstart is used to determine whether the engine 22 should be started. In the embodiment, a relation between the required torque Tr* and the accelerator operation amount Acc and the vehicle speed V is set in advance in the form of a required torque setting map, and is stored in the ROM 74. When the accelerator operation amount Acc and the vehicle speed V are provided, the required torque Tr* is set by deriving, from the stored map, the required torque Tr* corresponding to the accelerator operation amount Acc and the vehicle speed V. FIG. 7 shows an example of the required torque setting map. The travel power Pdrv* is calculated as the sum of a value obtained by multiplying the set required torque Tr* by a rotational speed Nr of the ring gear shaft 32$a$, and loss. The rotational speed Nr of the ring gear shaft 32$a$ is determined, for example, by multiplying the vehicle speed V by a conversion coefficient k (Nr=k·V), or by dividing the rotational speed Nm2 of the motor MG2 by a gear ratio Gr of the speed-reducing gear 35 (Nr=Nm2/Gr).

Figure 8:
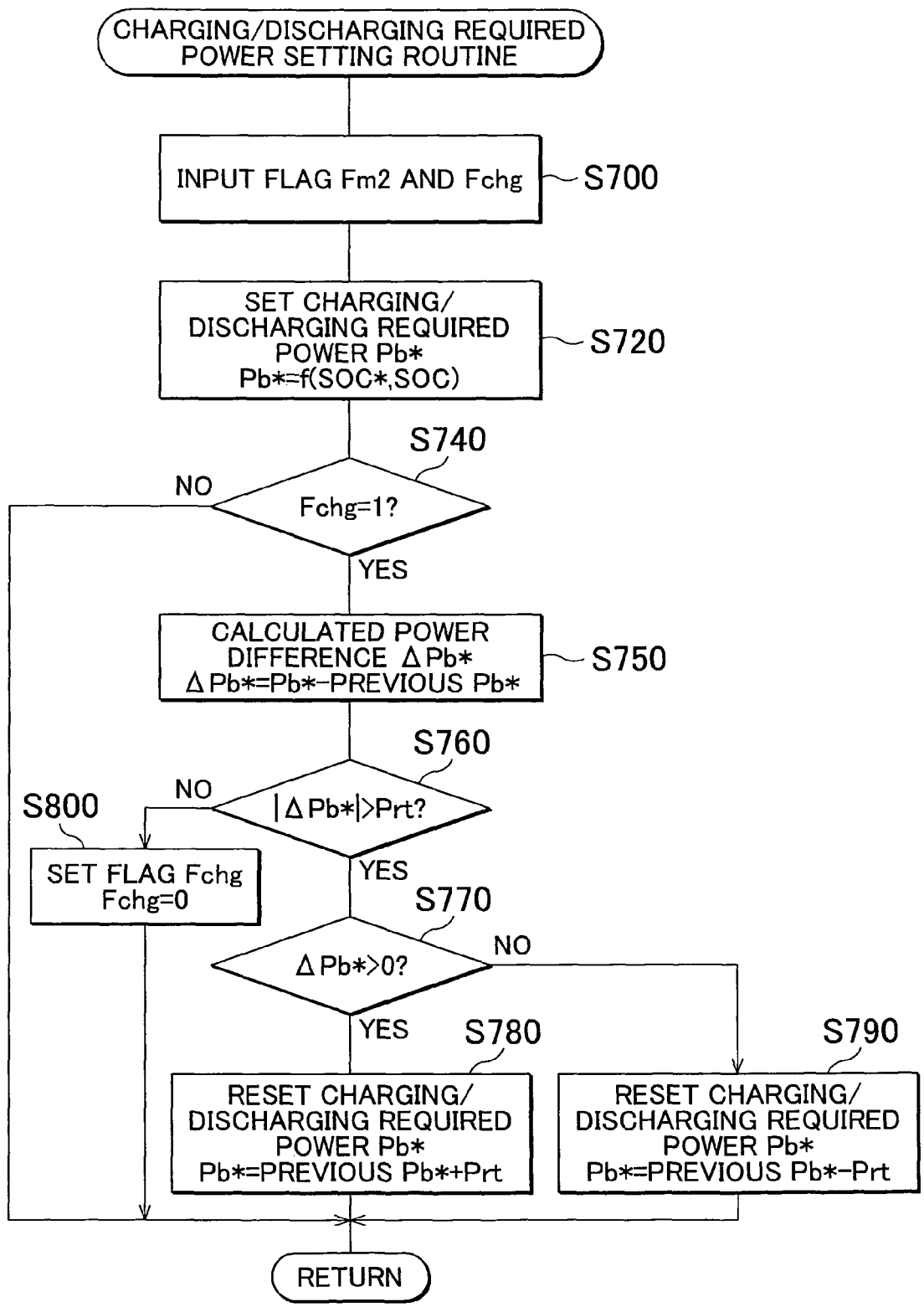
FIG. 8 is a flowchart showing an example of a charging/discharging required power setting routine executed by the hybrid electronic control unit.
Figure 9:
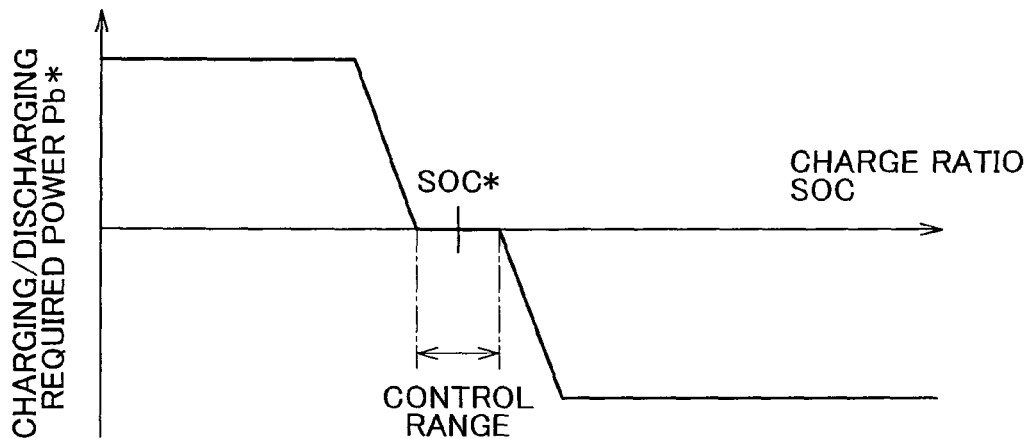
FIG. 9 is an explanatory diagram showing an example of a charging/discharging required power setting map.

Subsequently, charging/discharging required power Pb* is set based on the set target charge ratio SOC* and the charge ratio SOC (step S322). The charging/discharging required power Pb* is power necessary for charging or discharging the battery 50. In the embodiment, the charging/discharging required power Pb* is set according to a charging/discharging required power setting routine. FIG. 8 shows an example of the charging/discharging required power setting routine. In the charging/discharging required power setting routine, the travel mode change flag Fchg is input (step S700), and the charging/discharging required power Pb* is set based on the target charge ratio SOC* and the charge ratio SOC, using a charging/discharging required power setting map (step S720). FIG. 9 shows an example of the charging/discharging required power setting map. As shown in FIG. 9, if the charge ratio SOC is higher than an upper limit value in a control range whose center is the target charge ratio SOC* (for example, a range from a value higher than the target charge ratio SOC* by 5% or 10% to a value lower than the target charge ratio SOC* by 5% or 10%), the charging/discharging required power Pb* is set to a negative value in a manner such that as a difference between the upper limit value in the control range and the charge ratio SOC increases, the absolute value of the negative value increases, in order to eliminate the difference. If the charge ratio SOC is lower than a lower limit value in the control range, the charging/discharging required power Pb* is set to a positive value in a manner such that as the difference between the lower limit value in the control range and the charge ratio SOC increases, the absolute value of the positive value increases, in order to eliminate the difference. Thus, when the charge ratio SOC is outside the control range whose center is the target charge ratio SOC*, it is possible to control the charge ratio SOC so that the charge ratio SOC falls into the control range by setting the charging/discharging required power Pb* in the above-described manner. The charge ratio SOC is controlled to fall within the control range whose center is the target charge ratio SOC*, instead of controlling the charge ratio SOC to the target charge ratio SOC*, in order to reduce the possibility that charging and discharging are frequently performed. Subsequently, the value of the input travel mode change flag Fchg is checked (step S740). When the mode changeover switch 89 is not operated, the value of the travel mode change flag Fchg is 0. Therefore, a negative determination is made in step S740, and thus, the charging/discharging required power setting routine ends. In the electric-powered travel priority mode drive control routine, if the charge ratio SOC is equal to or lower than the central upper limit value Slim, the target charge ratio SOC* is set to the charge ratio SOC. Therefore, if the value of the travel mode change flag Fchg is 0, basically, the charging/discharging required power Pb* is set to 0. Descriptions will be made later on the case where the value of the travel mode change flag Fchg is 1, that is, the case where the mode changeover switch 89 is operated.

Referring back to the electric-powered travel priority mode drive control routine in FIGS. 5A and 5B, after the charging/discharging required power Pb* is set in the above-described manner, engine required power Pe* is set to a value obtained by adding the charging/discharging required power Pb* to the travel power Pdrv* (step S324). The engine required power Pe* is power required of the engine 22. Then, it is determined whether the engine 22 is being operated or the engine 22 is in a stopped state (step S330). If the engine 22 is in the stopped state, it is determined whether the set travel power Pdrv* is equal to or lower than the threshold value Pstart (step S340). If the travel power Pdrv* is equal to or lower than the threshold value Pstart, it is determined that the hybrid vehicle 20 is able to continue to travel in the electric-powered travel mode, and a torque command Tm1* for the motor MG1 is set to 0 (step S350). In addition, a torque command Tm2* indicating torque that should be output from the motor MG2 is set to a value obtained by dividing the required torque Tr* by the gear ratio Gr of the speed-reducing gear 35 (step S360). Then, the set torque commands Tm1* and Tm2* are transmitted to the motor ECU 40 (step S370), and the routine ends. After the motor ECU 40 receives the torque commands Tm1* and Tm2*, the motor ECU 40 executes a switching control for the switching elements (not shown) of the inverters 41 and 42 so that the torque indicated by the torque command Tm1* and the torque indicated by the torque command Tm2* are output from the motors MG1 and MG2, respectively. By executing the control, the required torque Tr* is output to the ring gear shaft 32*a* that is the drive shaft, from the motor MG2, so that the hybrid vehicle 20 is able to travel.

If it is determined that the travel power Pdrv* is higher than the threshold value Pstart in step S340, the engine 22 is started (step S390). The engine 22 is started as follows. Torque is output from the motor MG1 and torque is output from the motor MG2 so that the torque output from the motor MG2 cancels torque output to the ring gear shaft 32*a* due to the torque output from the motor MG1. Thus, the engine 22 is cranked. When the rotational speed Ne of the engine 22 reaches a predetermined rotational speed (for example, 1000 rpm), a fuel injection control, an ignition control, and the like are started. During the process of starting the engine 22 as well, the drive control for the motor MG2 is executed so that the required torque Tr* is output to the ring gear shaft 32*a*. That is, the torque that should be output from the motor MG2 is the sum of the torque for outputting the required torque Tr* to the ring gear shaft 32*a* and the torque for canceling the torque applied to the ring gear shaft 32*a* due to cranking of the engine 22.

Figure 10:
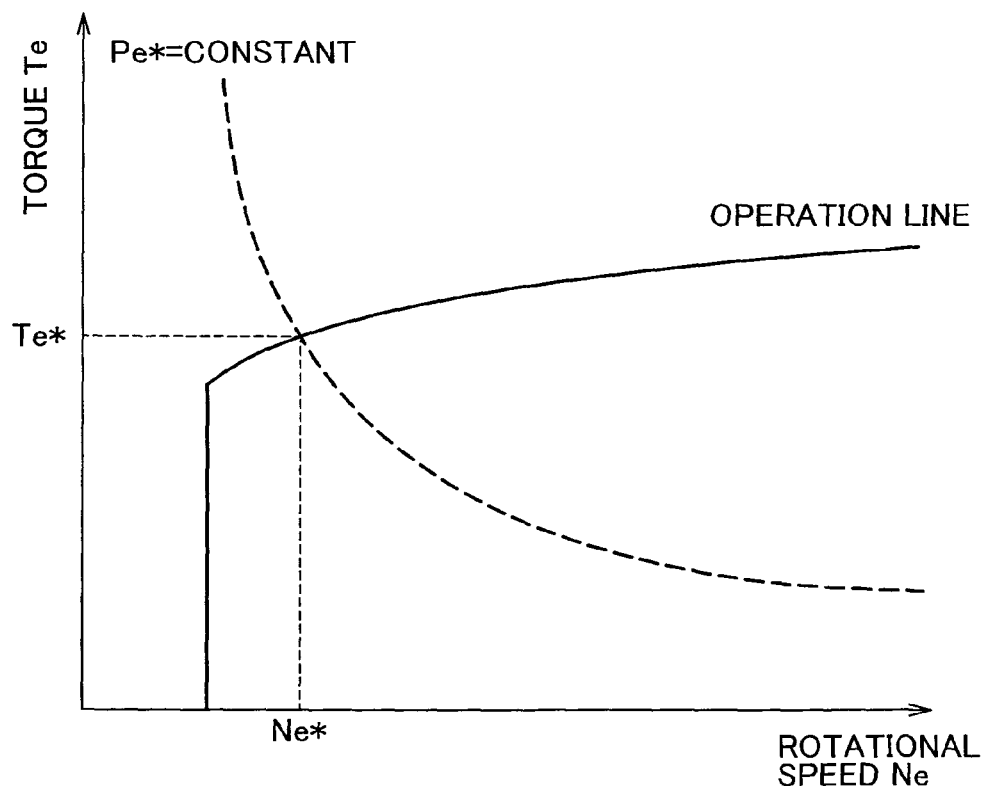
FIG. 10 is an explanatory diagram showing an example of an operation line for the engine, and an example of a manner in which a target rotational speed and target torque are set.

After the engine 22 is started, a target rotational speed Ne* and target torque Te* are set as an operation point at which the engine 22 should be operated, based on the set engine required power Pe* and an operation line for efficiently operating the engine 22 (step S420). FIG. 10 shows an example of the operation line for the engine 22 and a manner in which the target rotational speed Ne* and the target torque Te* are set. As shown in FIG. 10, the target rotational speed Ne* and the target torque Te* are determined based on an intersection of the operation line and a curved line indicating constant required power Pe*(Ne*×Te*).

Subsequently, a target rotational speed Nm1* of the motor MG1 is calculated using the target rotational speed Ne* of the engine 22, the rotational speed Nm2 of the motor MG2, and a gear ratio (the number of teeth of the sun gear/the number of teeth of the ring gear) ρ of the power split/integration mechanism 30, according to the equation (1) described below. In addition, the torque command Tm1* indicating the torque that should be output from the motor MG1 is calculated based on the calculated target rotational speed Nm1* and the input rotational speed Nm1 of the motor MG1 according to the equation (2) (step S430). The equation (1) is a mechanical relation equation for the rotational elements of the power split/integration mechanism 30. The equation (2) is a relation equation in a feedback control for rotating the motor MG1 at the target rotational speed Nm1*. In the equation (2), the second term "k1" In the right side is a gain of a proportional, and the third term "k2" in the right side is a gain of an integral term.

$$Nm1^* Ne^* \cdot (1+\rho)/\rho - Nm2/\rho \quad (1)$$

$$Tm1^* = \rho \cdot Te^*/(1+\rho) + k1(Nm1^* - Nm1) + k2\int(Nm1^* - Nm1)dt \quad (2)$$

Then, tentative motor torque Ttmp is calculated by adding a value, which is obtained by dividing the set torque command Tm1* by the gear ratio ρ of the power split/integration mechanism 30, to the required torque Tr* to produce a resultant, and dividing the resultant by the gear ratio Gr of the speed-reducing gear 35, according to the equation (3) described below (step S450). The tentative motor torque Ttmp is a tentative value of the torque that should be output from the motor MG2. Torque limits Tmax and Tmin are calculated according to the equations (4) and (5) described below (step S440). That is, the torque limit Tmax is calculated by dividing a difference between the output limit Wout for the battery 50 and electric power consumed by the motor MG1, by the rotational speed Nm2 of the motor MG2. The torque limit Tmin is calculated by dividing a difference between the input limit Win for the battery 50 and electric power generated by the motor MG1, by the rotational speed Nm2 of the motor MG2. The electric power consumed (or generated) by the motor MG1 is obtained by multiplying the set torque command Tm1* by the current rotational speed Nm1 of the motor MG1. The torque limits Tmax and Tmin are upper and lower limits of torque that may be output from the motor MG2. Then, the torque command Tm2* for the motor MG2 is set by limiting the set tentative motor torque Ttmp by the torque limits Tmax and Tmin according to the equation (6) described below (step S460). The target rotational speed Ne* and the target torque Te* of the engine 22 are transmitted to the engine ECU 24, and the torque commands Tm1* and Tm2* for the motors MG1 and MG2 are transmitted to the motor ECU 40 (step S470), and then, the routine ends. After the engine ECU 24 receives the target rotational speed Ne* and the target torque Te*, the engine ECU 24 executes the fuel injection control, the ignition control, an intake air amount adjustment control, and the like for the engine 22 so that the engine 22 is operated at an operation point (i.e., a target operation point) determined by the target rotational speed Ne* and the target torque Te*. After the motor ECU 40 receives the torque commands Tm1* and Tm2*, the motor ECU 40 executes the switching control for the switching elements (not shown) in the inverters 41 and 42 so that the torque indicated by the torque command Tm1* is output from the motor MG1, and the torque indicated by the torque command Tm2* is output from the motor MG2. If the value of the charging/discharging required power Pb* is 0, and the engine 22 is operated at the operation point determined by the target rotational speed Ne* and the target torque Te*, the travel power Pdrv* determined by the target rotational speed Ne* and the target torque Te* is output from the engine 22, and is converted to power determined by the rotational speed Nr of the ring gear shaft 32*a* and the required torque Tr*, using the power split/integration mechanism 30 and the two motors MG1 and MG2. Thus, the hybrid vehicle 20 travels.

$$Ttmp=(Tr^*+Tm1^*/\rho)/Gr \quad (3)$$

$$Tmax=(Wout-Tm1^* \cdot Nm1)/Nm2 \quad (4)$$

$$Tmin=(Win-Tm1^*-Nm1)/Nm2 \quad (5)$$

$$Tm2^*=\min(\max(Ttmp,Tmin),Tmax) \quad (6)$$

After the hybrid vehicle 20 starts to travel using power from the engine 22, it is determined that the engine 20 is being operated in step S330 when the routine is executed next time. Therefore, the travel power Pdrv* is compared with a value obtained by subtracting predetermined power α, which serves as a margin, from the threshold value Pstart (step S380). The predetermined power α is used to provide hysteresis so that the engine 22 is not frequently started and stopped when the travel power Pdrv* is near the threshold value Pstart. The predetermined power α may be appropriately set. If the travel power Pdrv* is equal to or higher than the value obtained by subtracting the predetermined power α from the threshold value Pstart, it is determined that the operation of the engine 22 should be continued. Thus, the target rotational speed Ne* and the target torque Te* of the engine 22, and the torque commands Tm1* and Tm2* for the motors MG1 and MG2 are set so that the power corresponding to the sum of the travel power Pdrv* and the charging/discharging required power Pb* is output from the engine 22, and the power determined by the rotational speed Nr and the required torque Tr* is output to the ring gear shaft 32a that is the drive shaft using the power split/integration mechanism 30 and the two motors MG1 and MG2, and thus the hybrid vehicle 20 travels. Then, the set target rotational speed Ne*, the set target torque Te*, and the set torque commands Tm1* and Tm2* are transmitted to the engine ECU 24 and the motor ECU 40 (steps S420 to S470), and then the routine ends.

If it is determined that the travel power Pdrv* is lower than the value obtained by subtracting the predetermined power α from the threshold value Pstart in step S380, the operation of the engine 22 is stopped (step S480), and the torque command Tm1* for the motor MG1 is set to 0, and the torque command Tm2* for the motor MG2 is set to the value obtained by dividing the required torque Tr* by the gear ratio Gr of the speed-reducing gear 35. The set torque commands Tm1* and Tm2* are transmitted to the motor ECU 40 (steps S350 to S370), and then, the routine ends.

Next, descriptions will be made on the operations executed when the set execution travel mode is the hybrid travel priority mode with reference to the hybrid travel priority mode drive control routine in FIGS. 6A and 6B. When the hybrid travel priority mode drive control routine is executed, first, the CPU 72 of the hybrid ECU 70 executes a process of receiving data necessary for the control, such as the accelerator operation amount Acc from the accelerator pedal position sensor 84, the vehicle speed V from the vehicle speed sensor 88, the rotational speeds Nm1 and Nm2 of the motors MG1 and MG2, the charge ratio SOC of the battery 50, and the input limit Win and the output limit Wout for the battery 50 (step S500). The required torque Tr* that is required to be output to the ring gear shaft 32a is set as the torque required by the vehicle, based on the input accelerator operation amount Acc and the input vehicle speed V, and the travel power Pdrv* that is required for travel by the vehicle is set (step S510). The ring gear shaft 32a is the drive shaft connected to the drive wheels 39a and 39b. The processes in steps S500 and S510 are the same as the processes in steps S300 and S310 in FIG. 5A.

Then, the threshold value Pstart is set to predetermined power Pset that is set in advance as a value near a lower limit value in a power region where the engine 22 is relatively efficiently operated (step S520). The threshold value Pstart is used to determine whether the engine 22 should be started.

Subsequently, the charging/discharging required power Pb* is set based on the target charge ratio SOC* and the charge ratio SOC (step S522). In addition, the engine required power Pe* is set to the sum of the charging/discharging required power Pb* and the travel power Pdrv* (step S524). The charging/discharging required power Pb* is set by the charging/discharging required power setting routine in FIG. 8 that is used in step S322 of the electric-powered travel priority mode drive control routine in FIG. 5A. In the charging/discharging required power setting routine in FIG. 8, the travel mode change flag Fchg is input (step S700), and the charging/discharging required power Pb* is set based on the target charge ratio SOC* and the charge ratio SOC, using the charging/discharging required power setting map shown (step S720). FIG. 9 shows the example of the charging/discharging required power setting map. Subsequently, the value of the travel mode change flag Fchg that has been input is checked (step S740). Except the case where the execution travel mode is switched to the hybrid travel priority mode, the value of the travel mode change flag Fchg is 0, and therefore, a negative determination is made in step S740, and then the charging/discharging required power setting routine ends.

Referring back to the hybrid travel priority mode drive control routine in FIGS. 6A and 6B, after the charging/discharging required power Pb* is set in the above-described manner, and the engine required power Pe* is set, it is determined whether the engine 22 is being operated or the engine 22 is in a stopped state (step S530). If the engine 22 is in the stopped state, it is determined whether the set engine required power Pe* is equal to or lower than the threshold value Pstart (step S540). If the engine required power Pe* is equal to or lower than the threshold value Pstart, it is determined that the hybrid vehicle 20 is able to continue to travel in the electric-powered travel mode, and the torque command Tm1* for the motor MG1 is set to 0 (step S550). In addition, the torque command Tm2* indicating torque that should be output from the motor MG2 is set to the value obtained by dividing the required torque Tr* by the gear ratio Gr of the speed-reducing gear 35 (step S560). Then, the set torque commands Tm1* and Tm2* are transmitted to the motor ECU 40 (step S570), and the routine ends. The processes in steps S550 to S570 are the same as the processes in steps S350 to S370 in the electric-powered travel priority mode in FIG. 5B.

If it is determined that the required power Pe* is higher than the threshold value Pstart in step S540, the engine 22 is started (step S590). The start of the engine 22 has been described above. After the engine 22 is started, the target rotational speed Ne* and the target torque Te* of the engine 22, and the torque commands Tm1* and Tm2* for the motors MG1 and MG2 are set so that the engine required power Pe*, which is the sum of the travel power Pdrv* and the charging/discharging required power Pb*, is output from the engine 22, and the power determined by the rotational speed Nr and the required torque Tr* is output to the ring gear shaft 32a using the power split/integration mechanism 30 and the two motors MG1 and MG2, and thus the hybrid vehicle 20 travels. Then, the set target rotational speed Ne*, the set target torque Te*, and the set torque commands Tm1* and Tm2* are transmitted to the engine ECU 24 and the motor ECU 40 (steps S620 to S670), and then the routine ends. The processes in steps S620 to S670 are the same as the processes in steps S420 to S470 that are executed after the engine required power Pe* is set in the electric-powered travel priority mode drive control routine, and that are shown in FIG. 5B.

After the hybrid vehicle 20 starts to travel using the power from the engine 22 in the above-described manner, it is determined that the engine 20 is being operated in step S530 when the routine is executed next time. Therefore, the engine required power Pe* is compared with a value obtained by subtracting predetermined power β, which serves as a margin, from the threshold value Pstart (step S580). The predetermined power β is used to provide hysteresis so that the engine 22 is not frequently started and stopped when the engine required power Pe* is near the threshold value Pstart. The predetermined power β may be appropriately set. The predetermined power β may be equal to the predetermined power α described above. If the engine required power Pe* is equal to or higher than the value obtained by subtracting the predetermined power α from the threshold value Pstart, it is determined that the operation of the engine 22 should be continued. Thus, the target rotational speed Ne* and the target torque Te* of the engine 22, and the torque commands Tm1* and Tm2* for the motors MG1 and MG2 are set so that the engine required power Pe*, which is the sum of the travel power Pdrv* and the charging/discharging required power Pb*, is output from the engine 22, and the power determined by the rotational speed Nr and the required torque Tr* is output to the ring gear shaft 32a that is the drive shaft using the power split/integration mechanism 30 and the two motors MG1 and MG2, and thus the hybrid vehicle 20 travels. Then, the set target rotational speed Ne*, the set target torque Te*, and the set torque commands Tm1* and Tm2* are transmitted to the engine ECU 24 and the motor ECU 40 (steps S620 to S670), and then the routine ends. In this case, if the charge ratio SOC is out of the control range whose center is the target charge ratio SOC*, the charging/discharging required power Pb* is set to a positive value or a negative value in accordance with the difference between the charge ratio SOC and the lower limit value or the upper limit value in the control range whose center is the target charge ratio SOC*, in order to eliminate the difference, by the process of setting the charging/discharging required power Pb* in step S522, that is, by the charging/discharging required power setting routine in FIG. 8. Then, the engine required power Pe* is set to the sum of the charging/discharging required power Pb* and the travel power Pdrv*. As a result, the battery 50 is charged or discharged using power with the positive value or the negative value in accordance with the difference between the charge ratio SOC and the lower limit value or the upper limit value in the control range, in order to eliminate the difference. Thus, when the charge ratio SOC is out of the control range whose center is the target charge ratio SOC*, the charge ratio SOC is controlled to fall into the control range.

Next, descriptions will be made on the operations executed when the execution travel mode is switched. The execution travel mode may be switched by the basic travel mode setting routine in FIG. 3 or by the mode changeover switch 89 being operated while the engine 22 is in the stopped state. In this case, because the engine 22 is in the stopped state, a situation does not occur, where a driver or an occupant feels discomfort due to sudden changes in the rotational speed and the torque of the engine 22 (i.e., a sudden change in the operation point). Thus, hereinafter, descriptions will be made on the operations executed when the execution travel mode is switched by the basic travel mode setting routine in FIG. 3 or by the mode changeover switch 89 being operated while the engine 22 is being operated.

First, descriptions will be made on operations executed when the execution travel mode is switched to the hybrid travel priority mode by the mode changeover switch 89 being operated while the hybrid vehicle 20 is traveling in the electric-powered travel priority mode, with the engine 22 being operated. While the hybrid vehicle 20 is traveling in the electric-powered travel priority mode with the engine 22 being operated, the target charge ratio SOC* is set to one of the current charge ratio SOC and the central upper limit value Slim, which is lower than the other, in step S312 in FIG. 5A. The charging/discharging required power Pb* is set by applying the target charge ratio SOC* and the charge ratio SOC to the charging/discharging required power setting map in FIG. 9. When the execution travel mode is switched to the hybrid travel priority mode while the hybrid vehicle 20 is in the above-described state, the target charge ratio SOC* is set to one of the charge ratio SOC and the central upper limit value Slim, which is lower than the other, in step S230 in FIG. 4, and the charging/discharging required power Pb* is set by applying the target charge ratio SOC* and the charge ratio SOC to the charging/discharging required power setting map in FIG. 9. Accordingly, there is no great change in the charging/discharging required power Pb* before and after switching of the execution travel mode. At this time, it is determined that the value of the travel mode change flag Fchg is 1 in step S740 in the charging/discharging required power setting routine in FIG. 8, because the execution travel mode has been switched. Then, power difference ΔPb* is calculated (step S750). The power difference ΔPb* is a value obtained by subtracting the previous charging/discharging required power Pb*, that is, the charging/discharging required power Pb* immediately before the switching of the execution travel mode to the hybrid travel priority mode, from the charging/discharging required power Pb* immediately after the switching of the execution travel mode to the hybrid travel priority mode, which has been calculated in step S720. Then, it is determined whether the absolute value of the calculated power difference ΔPb* is larger than a rate value Prt (step S760). The rate value Prt is a rate value in a rate limit process that is a process for gradually changing the charging/discharging required power Pb*. The rate value Prt may be set based on, for example, the frequency of setting the charging/discharging required power Pb*. As described above, in this case, a change in the charging/discharging required power Pb* before and after the switching of the execution travel mode is small. Therefore, it is determined that the absolute value of the power difference ΔPb* is smaller than the rate value Prt, and thus, the travel mode change flag Fchg is set to 0 (step S800), and the routine ends. When the execution travel mode is switched to the hybrid travel priority mode by the mode changeover switch 89 being operated while the hybrid vehicle 20 is traveling in the electric-powered travel priority mode with the engine 22 being operated, the travel power Pdrv* does not greatly change, and the change in the charging/discharging required power Pb* is small as described above. Therefore, a change in the engine required power Pe* due to the switching of the execution travel mode is also small. Accordingly, changes in the rotational speed Ne and the torque Te of the engine 22 are small (i.e., a change in the operation point is small).

Next, descriptions will be made on the operations executed when the execution travel mode is switched to the electric-powered travel priority mode by the mode changeover switch 89 being operated while the hybrid vehicle 20 is traveling in the hybrid travel priority mode with the engine 22 being operated. While the hybrid vehicle 20 is traveling in the hybrid travel priority mode with the engine 22 being operated, the target charge ratio SOC* is set to one of the charge ratio SOC at the time when the execution travel mode is switched from the electric-powered travel priority mode to the hybrid travel priority mode by the mode changeover switch 89 being operated, and the central upper limit value Slim, which is lower than the other. The charging/discharging required power Pb* is set by applying the set target charge ratio SOC* and the charge ratio SOC sequentially calculated, to the charging/discharging required power setting map in FIG. 9. If the charge ratio SOC is out of the control range whose center is the target charge ratio SOC*, the charging/discharging required power Pb* is set to electric power for charging or discharging the battery 50. When the execution travel mode is switched to the electric-powered travel priority mode while the hybrid vehicle 20 is in the above described state, the target charge ratio SOC* is set to one of the charge ratio SOC at that time and the central upper limit value Slim, which is lower than the other. The charging/discharging required power Pb* is set by applying the set target charge ratio SOC* and the charge ratio SOC at that time, to the charging/discharging required power setting map in FIG. 9. In the case where the charge ratio SOC at the time when the execution travel mode is switched is lower than the central upper limit value, the target charge ratio SOC* is set to the charge ratio SOC at that time. Therefore, the charging/discharging required power Pb* is set to 0. Accordingly, there is a change in the charging/discharging required power Pb* before and after the switching of the execution travel mode. At this time, it is determined that the value of the travel mode change flag Fchg is 1 in step S740 in the charging/discharging required power setting routine in FIG. 8, because the execution travel mode has been switched. Then, the power difference $\Delta Pb^*$ is calculated (step S750). The power difference $\Delta Pb^*$ is obtained by subtracting the previous charging/discharging required power Pb*, that is, the charging/discharging required power Pb* immediately before the switching of the execution travel mode to the electric-powered travel priority mode, from the charging/discharging required power Pb* immediately after the switching of the execution travel mode to the electric-powered travel priority mode, which has been calculated in step S720. Then, it is determined whether the absolute value of the calculated power difference $\Delta Pb^*$ is larger than the rate value Prt (step S760). In addition, it is determined whether the power difference $\Delta Pb^*$ is a positive value (step S770). If the absolute value of the power difference $\Delta Pb^*$ is larger than the rate value Prt and the power difference $\Delta Pb^*$ is a positive value, the charging/discharging required power Pb* is reset to a value obtained by adding the rate value Prt to the previous charging/discharging required power Pb* (step S780), and then the routine ends. If the absolute value of the power difference $\Delta Pb^*$ is larger than the rate value Prt and the power difference $\Delta Pb^*$ is a negative value, the charging/discharging required power Pb* is reset to a value obtained by subtracting the rate value Prt from the previous charging/discharging required power Pb* (step S790), and then the routine ends. By repeating the processes, the charging/discharging required power Pb* is changed by the rate value Prt each time the charging/discharging required power Pb* is changed, and thus the operation point for the engine 22 is gradually changed. By executing this rate limit process, the charging/discharging required power Pb* reset in step S780 or step S790 approaches the charging/discharging required power Pb* set in step S720. When the absolute value of the power difference $\Delta Pb^*$ is equal to or smaller than the rate value Prt in step S760, it is determined that the gradual change of the charging/discharging required power Pb* should be stopped, and the travel mode change flag Fchg is set to 0 (step S800), and then the routine ends. When the execution travel mode is switched to the electric-powered travel priority mode by the mode changeover switch 89 being operated while the hybrid vehicle 20 is traveling in the hybrid travel priority mode with the engine 22 being operated, the charging/discharging required power Pb* set based on the target charge ratio SOC* and the charge ratio SOC (i.e., the charging/discharging required power Pb* set in step S720) may be greatly changed due to the switching of the execution travel mode, although the travel power Pdrv* is not greatly changed. In this case, if the processes in steps S740 to S790 in the above-described charging/discharging required power setting routine in FIG. 8 were not executed, the engine required power Pe* would be greatly changed, and the rotational speed Ne and the torque Te of the engine 22 (i.e., the operation point) would be greatly changed. However, in the embodiment, the charging/discharging required power Pb* is gradually changed by the rate limit process, that is, by executing the processes in steps S740 to S790 in the charging/discharging required power setting routine in FIG. 8. Accordingly, the engine required power Pe* is gradually changed. This suppresses a sudden change in the operation point for the engine 22. As a result, it is possible to reduce the possibility that the driver or the occupant feels discomfort due to the sudden change in the operation point for the engine 22 caused by the mode changeover switch 89 being operated.

Next, descriptions will be made on the operations executed when the execution travel mode is switched to the hybrid travel priority mode by the basic travel mode setting routine while the engine 22 is being operated. While the hybrid vehicle 20 is traveling in the electric-powered travel priority mode with the engine 22 being operated before the switching of the execution travel mode, the target charge ratio SOC* is set to the current charge ratio SOC in step S312 in FIG. 5A, and the charging/discharging required power Pb* is set by applying the target charge ratio SOC* and the Charge ratio SOC to the charging/discharging required power setting map in FIG. 9. Therefore, basically, the charging/discharging required power Pb* is set to 0. When the execution travel mode is switched to the hybrid travel priority mode while the hybrid vehicle 20 is in the above-described state, the target charge ratio SOC* is set to the predetermined charge ratio Sset in step S180 in the basic travel mode setting routine in FIG. 3. The charging/discharging required power Pb* is set by applying the target charge ratio SOC* and the charge ratio SOC to the charging/discharging required power setting map in FIG. 9. If the predetermined charge ratio Sset is equal to the threshold value Shv2 or near the threshold value Shv2, the charge ratio SOC immediately after the switching of the execution travel mode falls within the control range in which the target charge ratio SOC* is the predetermined charge ratio Sset. Therefore, the charging/discharging required power Pb* is set to 0. If the predetermined charge ratio Sset is higher than the threshold value Shv2 to some degree, the charge ratio SOC immediately after the switching of the execution travel mode may be outside the control range in which the target charge ratio SOC* is the predetermined charge ratio Sset. Thus, the charging/discharging required power Pb* is set to a value for charging the battery 50. In some cases, the charging/discharging required power Pb* is set to a high value for charging the battery 50. At this time, it is determined that the value of the travel mode change flag Fchg is 1 in step S740 in the charging/discharging required power setting routine in FIG. 8, because the execution travel mode has been switched. Then, the power difference $\Delta Pb^*$ is calculated (step S750). The power difference $\Delta Pb^*$ is obtained by subtracting the previous charging/discharging required power Pb*, that is, the charging/discharging required power Pb* immediately before the switching of the execution travel mode to the hybrid travel priority mode, from the charging/discharging required power Pb* immediately after the switching of the execution travel mode to the hybrid travel priority mode, which has been calculated in step S720. Then, it is determined whether the absolute value of the calculated power difference ΔPb* is larger than the rate value Prt (step S760). In addition, it is determined whether the power difference ΔPb* is a positive value (step S770). Because the absolute value of the power difference ΔPb* is larger than the rate value Prt and the power difference ΔPb* is a positive value, the charging/discharging required power Pb* is reset to a value obtained by adding the rate value Prt to the charging/discharging required power Pb* immediately before the switching of the execution travel mode to the hybrid travel priority mode (step S780), and then the routine ends. By repeating the processes, the charging/discharging required power Pb* is changed by the rate value Prt each time the charging/discharging required power Pb* is changed, and thus the operation point for the engine 22 is gradually changed. By executing this rate limit process, the charging/discharging required power Pb* reset in step S780 approaches the charging/discharging required power Pb* set in step S720. When the absolute value of the power difference ΔPb* is equal to or smaller than the rate value Prt in step S760, it is determined that the gradual change of the charging/discharging required power Pb* should be stopped, and the travel mode change flag Fchg is set to 0 (step S800), and then the routine ends. When the execution travel mode is switched to the hybrid travel priority mode by the basic travel mode setting routine in FIG. 3 while the engine 22 is being operated, the charging/discharging required power Pb* set based on the target charge ratio SOC* and the charge ratio SOC (i.e., the charging/discharging required power Pb* set in step S720) may become a high value for charging the battery 50 due to the switching of the execution travel mode, although the travel power Pdrv* is not greatly changed. In this case, if the processes in steps S740 to S790 in the above-described charging/discharging required power setting routine in FIG. 8 were not executed, the engine required power Pe* would be greatly changed, and the rotational speed Ne and the torque Te of the engine 22 (i.e., the operation point) would be greatly changed. However, in the embodiment, the charging/discharging required power Pb* is gradually changed by the rate limit process, that is, by executing the processes in steps S740 to S780 in the charging/discharging required power setting routine in FIG. 8. Accordingly, the engine required power Pe* is gradually changed. This suppresses a sudden change in the operation point for the engine 22. As a result, it is possible to reduce the possibility that the driver or the occupant feels discomfort due to the sudden change in the operation point for the engine 22 caused by the mode changeover switch 89 being operated.

Thus, when the execution travel mode is switched while the hybrid vehicle 20 according to the embodiment is traveling with the engine 22 being operated, the charging/discharging required power Pb* is gradually changed by executing the gradual change process that is the rate limit process. Thus, it is possible to suppress a sudden change in the engine required power Pe*, which is the sum of the travel power Pdrv* and the charging/discharging required power Pb*, due to the switching of the execution travel mode. As a result, it is possible to suppress sudden changes in the rotational speed and the torque of the engine 22 (i.e., the operation point) due to the switching of the execution travel mode, and thus, it is possible to reduce the possibility that the driver or the occupant feels discomfort due to the sudden change in the operation point for the engine 22.

When the execution travel mode is switched while the hybrid vehicle 20 according to the embodiment is traveling with the engine 22 being operated, the charging/discharging required power Pb* is gradually changed by executing the gradual change process that is the rate limit process. However, the gradual change process is not limited to the rate limit process, as long as the charging/discharging required power Pb* is gradually changed. Other gradual change processes, for example, a smoothing process, may be used to gradually change the charging/discharging required power Pb*.

While the hybrid vehicle 20 according to the embodiment is traveling in the electric-powered travel priority mode, the target charge ratio SOC* is set to one of the current charge ratio SOC and the predetermined central upper limit value Slim, which is lower than the other, regardless of whether the engine 22 is being operated. However, while the hybrid vehicle 20 is traveling in the electric-powered travel priority mode, the target charge ratio SOC* may be set to the charge ratio SOC at the time when the engine 22 is started, and while the engine 22 is being operated, the set target charge ratio SOC* may be maintained.

While the hybrid vehicle 20 according to the embodiment is traveling in the electric-powered travel priority mode with the engine 22 being operated, the charging/discharging required power Pb* is set so that the charge ratio SOC falls within the control range whose center is the target charge ratio SOC*. However, the control range in this case may be smaller or larger than the control range used for the hybrid travel priority mode. Also, the configuration may be such that the control range is not provided, and the charging/discharging required power Pb* is set to eliminate the difference between the charge ratio SOC and the target charge ratio SOC*.

In the hybrid vehicle 20 according to the embodiment, when the execution travel mode is switched from the electric-powered travel priority mode to the hybrid travel priority mode by the mode changeover switch 89 being operated, the target charge ratio SOC* is set to one of the charge ratio SOC at the time when the execution travel mode is switched and the central upper limit value Slim, which is lower than the other. However, the target charge ratio SOC* may be set to the charge ratio SOC at the time when the execution travel mode is switched. Also, the target charge ratio SOC* may be set to a predetermined charge ratio, regardless of the charge ratio SOC at the time when the execution travel mode is switched.

While the hybrid vehicle 20 according to the embodiment is traveling in the hybrid travel priority mode with the engine 22 being operated, the charging/discharging required power Pb* is set so that the charge ratio SOC falls within the control range whose center is the target charge ratio SOC*. However, the configuration may be such that the control range is not provided, and the charging/discharging required power Pb* is set to eliminate the difference between the charge ratio SOC and the target charge ratio SOC*.

Figure 11:
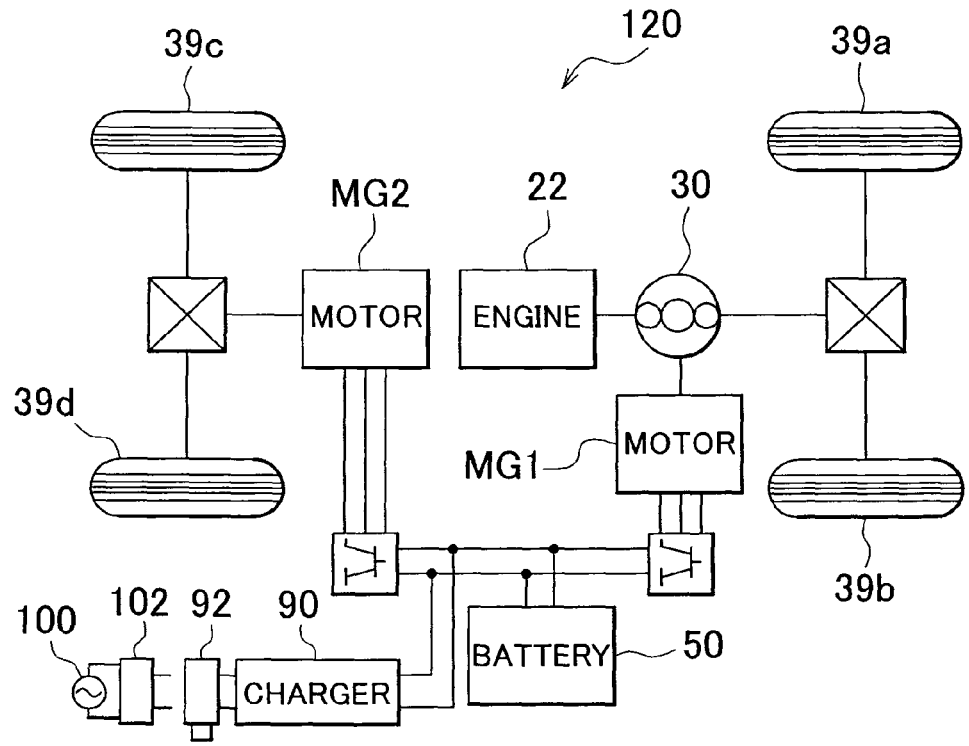
FIG. 11 is a configuration diagram showing the schematic configuration of a hybrid vehicle according to a modified example.
Figure 12:
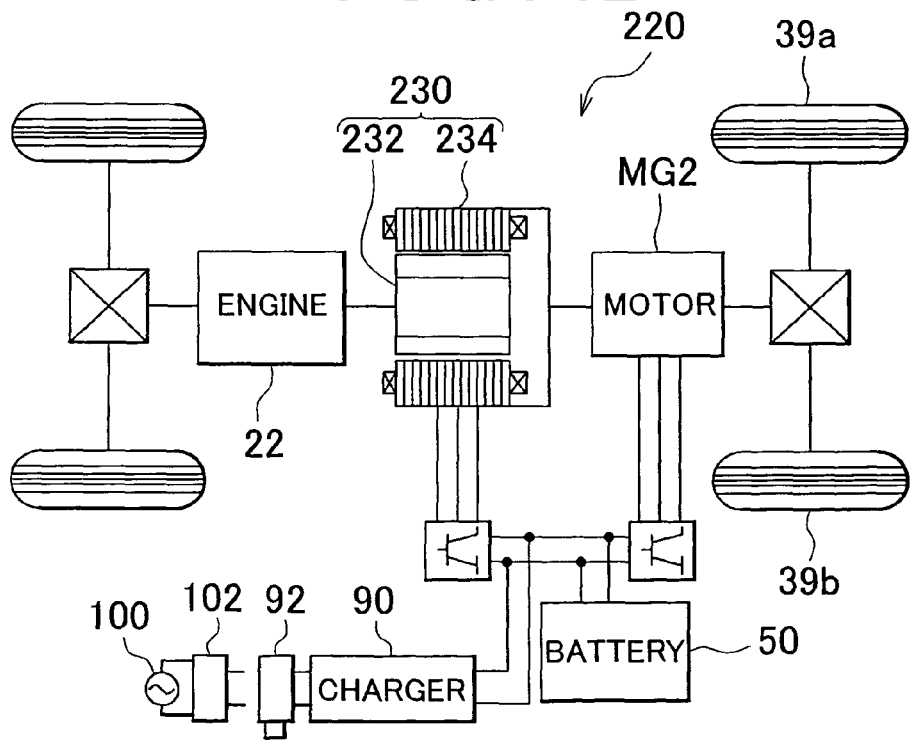
FIG. 12 is a configuration diagram showing the schematic configuration of a hybrid vehicle according to a modified example.
Figure 13:
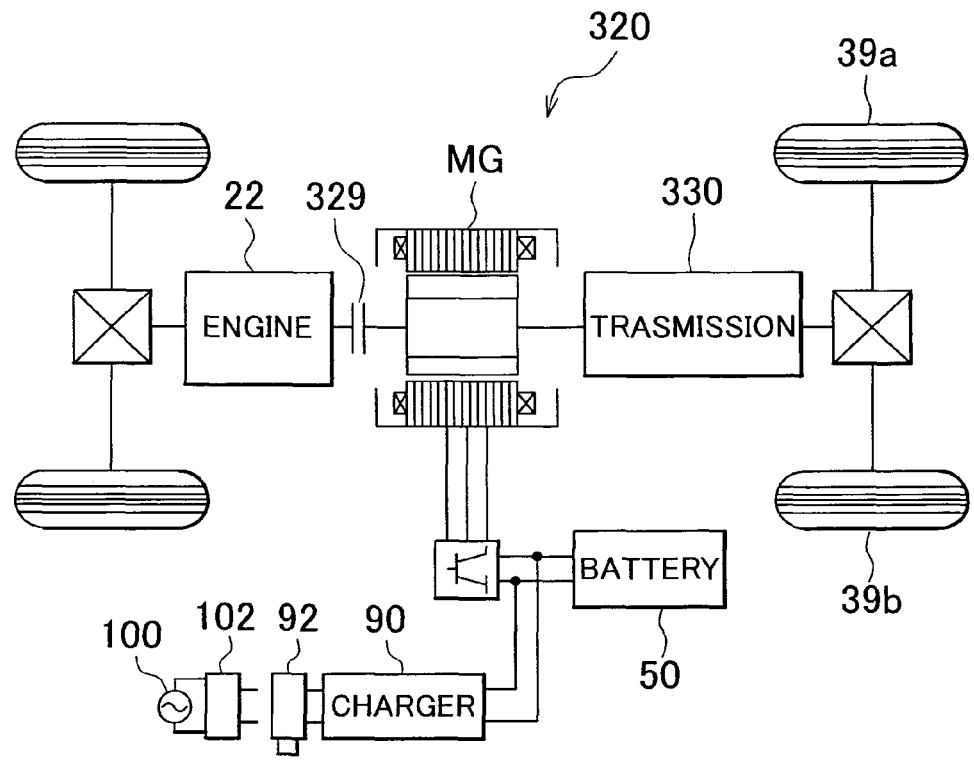
FIG. 13 is a configuration diagram showing the schematic configuration of a hybrid vehicle according to a modified example.
Figure 14:
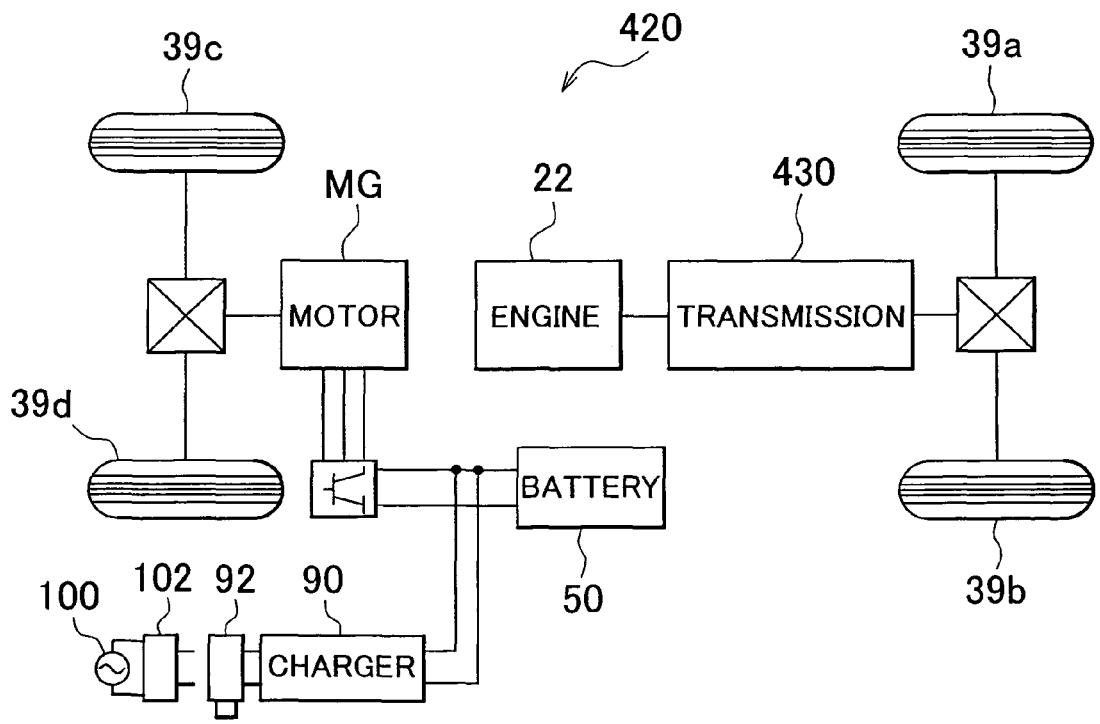
FIG. 14 is a configuration diagram showing the schematic configuration of a hybrid vehicle according to a modified example.

In the hybrid vehicle 20 according to the embodiment, the power from the engine 22 is output to the ring gear shaft 32a that is the drive shaft connected to the drive wheels 39a and 39b through the power split/integration mechanism 30, and the power from the motor MG2 is output to the ring gear shaft 32a after the rotational speed is changed by the speed-reducing gear 35. However, as shown in a hybrid vehicle 120 according to a modified example in FIG. 11, the configuration may be such that the power from the motor MG2 is output to an axle (i.e., an axle connected to drive wheels 39c and 39d in FIG. 11), which is other than an axle connected to a ring gear shaft (i.e., an axle connected to the drive wheels 39a and 39b). As shown in a hybrid vehicle 220 according to a modified example in FIG. 12, the configuration may be such that a paired-rotor motor 230 is provided, the paired-rotor motor 230 includes an inner rotor 232 connected to the crankshaft of the engine 22, and an outer rotor 234 connected to a drive shaft that outputs power to the drive wheels 39a and 39b, and the paired-rotor motor 230 transmits part of the power from the engine 22 to the drive shaft, and converts the rest of the power to electric power. Also, as shown in a hybrid vehicle 320 according to a modified example in FIG. 13, the configuration may be such that a motor MG is connected to a drive shaft connected to the drive wheels 39a and 39b through a transmission 330, the engine 22 is connected to the rotational shaft of the motor MG through a clutch 329, the power from the engine 22 is output to the rotational shaft of the motor MG, and is output to the drive shaft through the transmission 330, and the power from the motor MG is output to the drive shaft through the transmission 330. Further, as shown in a hybrid vehicle 420 according to a modified example in FIG. 14, the configuration may be such that the power from the engine 22 is output to an axle connected to the drive wheels 39a and 39b through a transmission 430, and the power from the motor MG is output to an axle (i.e., an axle connected to the drive wheels 39c and 39d in FIG. 14), which is other than an axle connected to the drive wheels 39a and 39b. Further, in the configuration of each of the hybrid vehicles 20, 120, 220, 320, and 420 according to the embodiment and the modified examples, the charger 90 may be removed. That is, a hybrid vehicle of any type may be employed as long as the hybrid vehicle includes an internal combustion engine that outputs power for travel, a motor to and from which power for travel is input and output, a secondary battery that transmits and receives electric power to and from the motor; and the hybrid vehicle travels using only the power input to and output from the motor in an electric-powered travel mode, and the hybrid vehicle travels using the power output from the internal combustion engine and the power input to and output from the motor in a hybrid travel mode.

In the embodiment, the invention is applied to the hybrid vehicle. However, the invention may be applied to a control method for the hybrid vehicle.

In the embodiment, the engine 22 may be regarded as "the internal combustion engine" according to the invention, the motor MG2 may be regarded as "the motor" according to the invention, and the battery 50 may be regarded as "the secondary battery" according to the invention. The hybrid ECU 70 that executes the basic travel mode setting routine in FIG. 3 and the switch operation-time process routine may be regarded as "the mode setting portion" according to the invention. The hybrid ECU 70, the engine ECU 24, and the motor ECU 40 may be regarded as "the control portion" according to the invention. The hybrid ECU 70 executes the charging/discharging required power setting routine in FIG. 8 to set the charging/discharging required power Pb* so that the charging/discharging required power Pb* is gradually changed by the rate limit process when the execution travel mode is switched while the engine 22 is being operated, and the hybrid ECU 70 executes the electric-powered travel priority mode drive control routine in FIGS. 5A and 5B to perform the drive control so that the hybrid vehicle 20 travels in the switched execution travel mode using the charging/discharging required power Pb* set in the charging/discharging required power setting routine in FIG. 8. The engine ECU 24 receives the target rotational speed Ne* and the target torque Te* from the hybrid ECU 70, and executes the control so that the engine 22 is operated at the operation point determined by the target rotational speed Ne* and the target torque Te*. The motor ECU 40 receives the torque commands Tm1* and Tm2* from the hybrid ECU 70; and executes the control so that the motors MG1 and MG2 are operated according to the received torque commands Tm1* and Tm2*. The mode changeover switch 89 may be regarded as "the mode selection switch" according to the invention. The battery ECU 52, which calculates the charge ratio SOC based on the accumulated value of the charging/discharging electric current Ib detected by the electric current sensor 51b, may be regarded as the "charge ratio calculation portion" according to the invention. The charge ratio is the ratio of the amount of electricity that can be discharged from the battery 50 to the entire capacity of the battery 50. The charger 90 may be regarded as "the charger" according to the invention. The hybrid ECU 70, which executes the basic travel mode setting routine in FIG. 3, may be regarded as "the basic travel mode setting portion" according to the invention. The motor MG1 may be regarded as "the generator" according to the invention, and the power split/integration mechanism 30 may be regarded as "the planetary gear mechanism" according to the invention.

"The internal combustion engine" according to the invention is not limited to an internal combustion engine that outputs power using hydrocarbon fuel such as gasoline or light oil. "The internal combustion engine" according to the invention may be an internal combustion engine of any type, for example, a hydrogen engine. "The motor" according to the invention is not limited to the motor MG2 configured as a synchronous motor-generator, and may be a motor of any type, for example, an induction motor, as long as power is input to the motor from the drive shaft, and is output from the motor to the drive shaft. "The secondary battery" according to the invention is not limited to the battery 50 configured as a lithium ion secondary battery. Various secondary batteries, such as a nickel hydrogen secondary battery, a nickel cadmium secondary battery, and a lead battery, may be employed as "the secondary battery" according to the invention. "The mode setting portion" according to the invention is not limited to the portion that executes the basic travel mode setting routine in FIG. 3 and the switch operation-time process routine. "The mode setting portion" according to the invention may be any portion, as long as the portion sets the execution travel mode to one of the two travel modes including the electric-powered travel priority mode where the hybrid vehicle travels with priority being given to the electric-powered travel mode over the hybrid travel mode, and the hybrid travel priority mode where the hybrid vehicle travels with priority being given to the hybrid travel mode over the electric-powered travel mode. "The control portion" according to the invention is not limited to the combination of the hybrid ECU 70, the engine ECU 24, and the motor ECU 40. For example, "the control portion" according to the invention may be configured as a single electronic control unit. Also, "the control portion" according to the invention is not limited to the portion that sets the charging/discharging required power Pb* in a manner such that the charging/discharging required power Pb* is gradually changed by executing the rate limit process when the execution travel mode is switched while the engine 22 is being operated, sets the engine required power Pe* using this charging/discharging required power Pb*, and controls the engine 22 and the motors MG1 and MG2 so that the engine required power Pe* is output from the engine 22 and the required torque Tr* is output to the ring gear shaft 32a that is the drive shaft and thus the hybrid vehicle 20 travels. "The control portion" according to the invention may be any portion, as long as when the execution travel mode is switched by the mode setting portion while the internal combustion engine is being operated, the portion controls the internal combustion engine and the motor so that the charging/discharging electric power for charging or discharging the secondary battery is gradually changed and the hybrid vehicle travels in the switched execution travel mode.

The main elements according to the invention are not limited to the main elements described in the embodiment. That is, while the invention has been described with reference to the embodiment, it is to be understood that the invention is not limited to the embodiment. The invention may be implemented in various embodiments within the scope of the invention.

The invention claimed is:

1. A hybrid vehicle that includes an internal combustion engine that outputs power for travel; a motor to and from which power for travel is input and output; and a secondary battery that transmits and receives electric power to and from the motor, wherein the hybrid vehicle travels using only the power input to and output from the motor in an electric-powered travel mode, and the hybrid vehicle travels using the power output from the internal combustion engine and the power input to and output from the motor in a hybrid travel mode, the hybrid vehicle comprising:

a hybrid electronic control unit (ECU) including program logic configured to:

set an execution travel mode to one of two travel modes including an electric-powered travel priority mode where the hybrid vehicle travels with priority being given to the electric-powered travel mode over the hybrid travel mode, and a hybrid travel priority mode where the hybrid vehicle travels with priority being given to the hybrid travel mode over the electric-powered travel mode; and when the execution travel mode is switched while the internal combustion engine is being operated, control the internal combustion engine and the motor so that charging/discharging electric power for charging or discharging the secondary battery is gradually changed and the hybrid vehicle travels in the switched execution travel mode; and a battery electronic control unit (ECU) including program logic configured to:

calculate a charge ratio that is a ratio of an amount of electricity stored in the secondary battery to an entire capacity of the secondary battery, based on a state of the secondary battery, wherein the hybrid ECU sets engine required power that is to be output from the internal combustion engine, based on a sum of travel power that is required for travel based on an accelerator operation, and charging/discharging required power that is required for charging or discharging the secondary battery based on the calculated charge ratio, and controls the internal combustion engine and the motor so that the set engine required power is output from the internal combustion engine under a predetermined restriction imposed on an operation of the internal combustion engine and the hybrid vehicle travels with the travel power; and when the execution travel mode is switched while the engine is being operated, the hybrid ECU sets and controls the charging/discharging required power so that the charging/discharging required power is gradually changed to decrease a difference in the charging/discharging required power due to switching of the execution travel mode.

2. The hybrid vehicle according to claim 1, further comprising a mode selection switch that is operated by an operator to select one of the two travel modes including the electric-powered travel priority mode and the hybrid travel priority mode, wherein the hybrid ECU sets the execution travel mode to the travel mode selected by the mode selection switch.

3. The hybrid vehicle according to claim 1, wherein when the execution travel mode is switched, the hybrid ECU controls the charging/discharging required power so that the charging/discharging required power in the execution travel mode before switched is changed to the charging/discharging required power in the execution travel mode after switched in a manner such that the charging/discharging required power is changed by predetermined power per unit time.

4. The hybrid vehicle according to claim 1, wherein when the set execution travel mode is the electric-powered travel priority mode, the hybrid ECU sets a target charge ratio to the charge ratio that is sequentially calculated by the battery ECU, and sets and controls the charging/discharging required power so that the charge ratio calculated by the battery ECU is equal to the target charge ratio; and when the set execution travel mode is the hybrid travel priority mode, the hybrid ECU sets and controls the charging/discharging required power so that the charge ratio calculated by the battery ECU falls within a control range whose center is the target charge ratio, the target charge ratio being set in a predetermined manner at a time when the execution travel mode is set to the hybrid travel priority mode.

5. The hybrid vehicle according to claim 4, wherein the predetermined manner is a manner in which when the execution travel mode is set to the hybrid travel priority mode due to the charge ratio, which is calculated by the battery ECU, becoming lower than a first charge ratio below which the execution travel mode is to be set to the hybrid travel priority mode, the target charge ratio is set to a second charge ratio that is set in advance as a value equal to or higher than the first charge ratio, and when the execution travel mode is set to the hybrid travel priority mode due to a cause that is not related to the charge ratio calculated by the battery ECU, the target charge ratio is set to the charge ratio that is calculated by the battery ECU at the time when the execution travel mode is set to the hybrid travel priority mode.

6. The hybrid vehicle according to claim 4, wherein the predetermined manner is a manner in which when the execution travel mode is set to the hybrid travel priority mode due to the charge ratio, which is calculated by the battery ECU, becoming lower than a first charge ratio below which the execution travel mode is to be set to the hybrid travel priority mode, the target charge ratio is set to a second charge ratio that is set in advance as a value equal to or higher than the first charge ratio, and when the execution travel mode is set to the hybrid travel priority mode due to a cause that is not related to the charge ratio calculated by the battery ECU, if the charge ratio calculated by the battery ECU at the time when the execution travel mode is set to the hybrid travel priority mode is equal to or higher than a third charge ratio, the target charge ratio is set to the third charge ratio, and if the charge ratio calculated by the battery ECU at the time when the execution travel mode is set to the hybrid travel priority mode is lower than the third charge ratio, the target charge ratio is set to the calculated charge ratio.

7. The hybrid vehicle according to claim 1, wherein
in a case where the internal combustion engine is operated in the hybrid travel priority mode, when the charge ratio calculated by the battery ECU is out of a control range, the hybrid ECU sets the charging/discharging required power so as to eliminate a difference between the charge ratio and a limit value in the control range.

8. The hybrid vehicle according to claim 1, further comprising:
a charger that is connected to an external power source to charge the secondary battery with electric power from the external power source, while a system of the hybrid vehicle is stopped; and
the hybrid ECU, at least when the calculated charge ratio is equal to or higher than a fourth charge ratio at a time when the system is started, sets the execution travel mode to the electric-powered travel priority mode until the calculated charge ratio becomes lower than a first charge ratio that is lower than the fourth charge ratio during traveling of the hybrid vehicle, wherein when the execution travel mode is not set to the electric-powered travel priority mode, the hybrid ECU sets the execution travel mode to the hybrid travel priority mode.

9. The hybrid vehicle according to claim 8, further comprising:
a generator which transmits and receives electric power to and from the secondary battery, and to and from which power is input and output; and
a planetary gear mechanism whose three rotational elements are connected to three shafts including an output shaft of the internal combustion engine, a rotational shaft of the generator, and a drive shaft connected to an axle,
wherein
the hybrid ECU controls the generator when controlling an operation of the internal combustion engine.

10. A control method for a hybrid vehicle that includes an internal combustion engine that outputs power for travel; a motor to and from which power for travel is input and output; and a secondary battery that transmits and receives electric power to and from the motor, wherein the hybrid vehicle travels using only the power input to and output from the motor in an electric-powered travel mode, and the hybrid vehicle travels using the power output from the internal combustion engine and the power input to and output from the motor in a hybrid travel mode, the control method comprising:
setting an execution travel mode to one of two travel modes including an electric-powered travel priority mode where the hybrid vehicle travels with priority being given to the electric-powered travel mode over the hybrid travel mode, and a hybrid travel priority mode where the hybrid vehicle travels with priority being given to the hybrid travel mode over the electric-powered travel mode; and
controlling the internal combustion engine and the motor so that the hybrid vehicle travels in the set execution travel mode, wherein
when the execution travel mode is switched while the internal combustion engine is being operated, the internal combustion engine and the motor are controlled so that charging/discharging electric power for charging or discharging the secondary battery is gradually changed and the hybrid vehicle travels in the switched execution travel mode;
engine required power that is to be output from the internal combustion engine is set based on a sum of travel power that is required for travel, and charging/discharging required power that is required for charging or discharging the secondary battery based on a charge ratio that is a ratio of an amount of electricity stored in the secondary battery to an entire capacity of the secondary battery;
the internal combustion engine and the motor are controlled so that the set engine required power is output from the internal combustion engine under a predetermined restriction imposed on an operation of the internal combustion engine and the hybrid vehicle travels with the travel power; and
when the execution travel mode is switched while the engine is being operated, the charging/discharging required power is set and controlled so that the charging/discharging required power is gradually changed to decrease a difference in the charging/discharging required power due to switching of the execution travel mode.

11. The control method according to claim 10, wherein
when the execution travel mode is switched, the charging/discharging required power is controlled so that the charging/discharging required power in the execution travel mode before switched is changed to the charging/discharging required power in the execution travel mode after switched in a manner such that the charging/discharging required power is changed by predetermined power per unit time.

12. The control method according to claim 10, wherein
when the set execution travel mode is the electric-powered travel priority mode, a target charge ratio is set to the charge ratio that is sequentially calculated, and the charging/discharging required power is set and controlled so that the calculated charge ratio is equal to the target charge ratio, and when the set execution travel mode is the hybrid travel priority mode, the charging/discharging required power is set and controlled so that the calculated charge ratio falls within a control range whose center is the target charge ratio that is set in a predetermined manner at a time when the execution travel mode is set to the hybrid travel priority mode.

* * * * *